United States Patent
Son et al.

(10) Patent No.: US 10,209,580 B2
(45) Date of Patent: Feb. 19, 2019

(54) LIQUID CRYSTAL DISPLAY DEVICE

(71) Applicant: Samsung Display Co., Ltd, Yongin-si, Gyeonggi-do (KR)

(72) Inventors: Jeong Man Son, Suwon-si (KR); Min Wook Park, Asan-si (KR); Jong-Keun Kim, Seoul (KR); Jin Young Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 155 days.

(21) Appl. No.: 15/008,585

(22) Filed: Jan. 28, 2016

(65) Prior Publication Data

US 2016/0223874 A1 Aug. 4, 2016

(30) Foreign Application Priority Data

Feb. 4, 2015 (KR) ........................ 10-2015-0017378

(51) Int. Cl.
*G02F 1/1362* (2006.01)
*G02F 1/1343* (2006.01)

(52) U.S. Cl.
CPC .... *G02F 1/134309* (2013.01); *G02F 1/13624* (2013.01); *G02F 2001/134345* (2013.01)

(58) Field of Classification Search
CPC ......... G02F 2001/136222; G02F 2001/134345
See application file for complete search history.

(56) References Cited

U.S. PATENT DOCUMENTS

| 7,834,962 B2 | 11/2010 | Satake et al. | |
| 2006/0250536 A1* | 11/2006 | Kim | G02F 1/136209 349/43 |
| 2006/0284172 A1* | 12/2006 | Ishii | H01L 29/7869 257/43 |
| 2007/0146569 A1* | 6/2007 | Nouchi | G02B 6/0088 349/58 |
| 2009/0251647 A1* | 10/2009 | Lee | G02F 1/133514 349/106 |

(Continued)

FOREIGN PATENT DOCUMENTS

| KR | 10-2009-0103461 A | 10/2009 |
| KR | 10-2011-0080627 A | 7/2011 |

(Continued)

*Primary Examiner* — Alexander Gross
(74) *Attorney, Agent, or Firm* — Innovation Counsel LLP

(57) ABSTRACT

A liquid crystal display device includes: a first insulation substrate; a gate line and data line positioned on the first insulation substrate and insulatively crossing each other; a thin film transistor connected with the gate line and data line; a pixel electrode connected with the thin film transistor; a second insulation substrate spaced apart from and facing the first insulation substrate; and a common electrode positioned on the second insulation substrate, in which the pixel electrode includes a first subpixel electrode including first minute branches extended in a plurality of directions and a second subpixel electrode separated from the first subpixel electrode and including second minute branches, one pixel includes the thin film transistor and pixel electrode, and extending directions of the first minute branches and the second minute branches adjacent to each other in an extending direction of the gate line within one pixel are parallel to each other.

22 Claims, 18 Drawing Sheets

(56) References Cited

U.S. PATENT DOCUMENTS

| | | | |
|---|---|---|---|
| 2012/0105785 A1* | 5/2012 | Kim | G09G 3/3648 349/139 |
| 2013/0002625 A1* | 1/2013 | Liao | G02F 1/134309 345/205 |
| 2015/0036077 A1 | 2/2015 | Lee et al. | |

FOREIGN PATENT DOCUMENTS

| | | |
|---|---|---|
| KR | 10-2013-0125638 A | 11/2013 |
| KR | 10-2015-0016462 A | 2/2015 |

* cited by examiner

LIQUID CRYSTAL DISPLAY DEVICE

CROSS-REFERENCE TO RELATED APPLICATION

This application claims priority to and the benefit of Korean Patent Application No. 10-2015-0017378 filed in the Korean Intellectual Property Office on Feb. 4, 2015, the entire contents of which are incorporated herein by reference.

BACKGROUND (a) Field

The present invention relates to a liquid crystal display device.

(b) Description of the Related Art

Liquid crystal display devices, which are one of the most common types of flat panel displays currently in use, include two display units with field generating electrodes, such as a pixel electrode and a common electrode, and a liquid crystal layer interposed therebetween. Liquid crystal display devices generate an electric field in the liquid crystal layer by applying voltage to the field generating electrodes. The generated electric field determines the direction of liquid crystal molecules of the liquid crystal layer, thus controlling polarization of incident light so as to display images.

When liquid crystal display devices are used as display devices for television receivers, the size of the screen has become increasingly large. As the size of the liquid crystal display is increased, there is a problem in that the difference in the image viewed when a viewer views a center of the screen and when the viewer views left and right ends of the screen is increased.

In order to compensate for the viewing difference, the display device is curved in a concave or convex shape to be formed in a curved shape. The display device may be a portrait type which has a larger vertical length than a horizontal length and is curved in a vertical direction, and may also be a landscape type which has a smaller vertical length than a horizontal length and is curved in a horizontal direction.

As such, when the display device is curved to have a curved shape, a texture, reduction in luminance, and the like occur due to misalignment between upper and lower substrates.

The above information disclosed in this Background section is only for enhancement of understanding of the background of the invention and therefore it may contain information that does not form the prior art that is already known to a person of ordinary skill in the art.

SUMMARY

A liquid crystal display device having advantages of removing a texture and a dark portion occurring in the display device and particularly, provide improved luminance in a curved display device is provided.

In one aspect, a liquid crystal display device includes: a first insulation substrate; a gate line and a data line positioned on the first insulation substrate and insulatively crossing each other; a thin film transistor connected with the gate line and data line; a pixel electrode connected with the thin film transistor; a second insulation substrate spaced apart from and facing the first insulation substrate; and a common electrode positioned on the second insulation substrate, in which the pixel electrode includes a first subpixel electrode including first minute branches extended in a plurality of directions and a second subpixel electrode separated from the first subpixel electrode and including second minute branches, in which one pixel includes the thin film transistor and the pixel electrode, and extending directions of the first minute branches and the second minute branches which are adjacent to each other in an extending direction of the gate line within one pixel are parallel to each other.

The liquid crystal display device may be curved.

One first subpixel electrode may be included and two second subpixel electrodes may be included, and the two second subpixel electrodes may be positioned at left and right sides of the first subpixel electrode, respectively.

The two second subpixel electrodes may be connected to each other.

The first subpixel electrode may further include a cross stem and an extension positioned at the center of the cross stem, and the first minute branch may be extended from the cross stem.

A planar shape of the extension may be any one of polygons or similar polygons.

The first subpixel electrode may include four regions divided according to an alignment direction of the liquid crystal molecules, each of the second subpixel electrodes may include two regions divided according to an alignment direction of the liquid crystal molecules, and the two second subpixel electrodes may have different alignment directions of the liquid crystal molecules.

The one pixel area may include a high-gray pixel area and a low-gray pixel area, and the thin film transistor may include a first thin film transistor connected with the high-gray pixel area, a second thin film transistor connected with the low-gray pixel area, and a third thin film transistor connected with the second thin film transistor and a reference voltage line.

The thin film transistor may include a gate line positioned on the first insulation substrate and extended in a column direction, a semiconductor layer positioned on the gate line, a data line positioned on the semiconductor layer, extended in a row direction, and including a source electrode, and a drain electrode.

The first subpixel electrode may be connected with a first thin film transistor, and the second subpixel electrode may be connected with a second thin film transistor.

The liquid crystal display device may further include a connection signal line positioned on the same layer as the gate line, in which the connection signal line may be electrically connected with the first thin film transistor and the first subpixel electrode.

The connection signal line may transverse the pixel electrode in the column direction.

The reference voltage line may include a vertical portion positioned between the first subpixel electrode and the second subpixel electrode and a horizontal portion connecting the vertical portions.

The first thin film transistor may be connected to the second subpixel electrode, the second thin film transistor may be connected to the first subpixel electrode, and an area of the first subpixel electrode may be larger than that of the plurality of second subpixel electrodes.

The liquid crystal display device may further include a connection signal line positioned on the same layer as the gate line, in which the connection signal line may be electrically connected with the second thin film transistor and the first subpixel electrode.

The first subpixel electrode may include two regions divided according to an alignment direction of the liquid crystal molecules.

A plurality of the first subpixel electrodes included in the adjacent pixel area may include four regions divided according to an alignment direction of the liquid crystal molecules.

The liquid crystal display device may further include a gate insulating layer positioned on the gate line; a passivation layer positioned on the data line; and a color filter positioned on the passivation layer.

The liquid crystal display device may further include a light blocking member positioned on the passivation layer.

The color filter may be the same color in the column direction

The liquid crystal display device may further include an auxiliary signal line positioned on the same layer as the pixel electrode and overlapping with the data line.

The liquid crystal display device may further include a dummy electrode pattern positioned on the same layer as the gate line and overlapping with a vertical portion of the reference voltage line.

According to exemplary embodiments, in the liquid crystal display device including the pixel electrode having the above shape, even in the case where the display device is curved, generation of the dark portion due to misalignment of the upper and lower display panels may be reduced, and as a result, luminance and image quality of the display device may be improved.

DETAILED DESCRIPTION OF THE EMBODIMENTS

Figure 1:
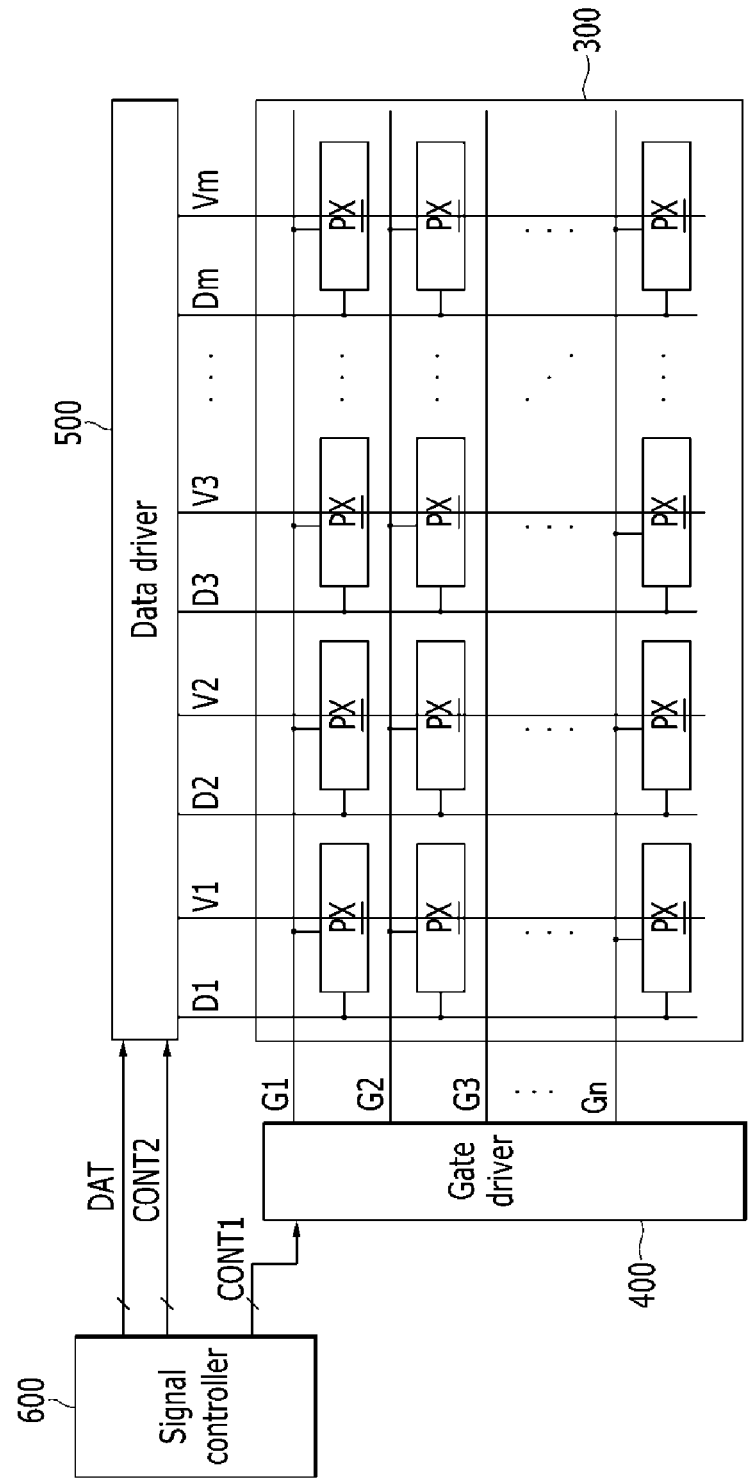
FIG. 1 is a block diagram illustrating a display device according to an exemplary embodiment.

The present invention will be described more fully hereinafter with reference to the accompanying drawings, in which exemplary embodiments are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a display device according to an exemplary embodiment will be described in detail with reference to FIG. 1.

FIG. 1 is a block diagram illustrating a display device according to an exemplary embodiment.

A display device according to an exemplary embodiment includes a display panel 300 displaying an image, a data driver 500 driving the display panel 300, a gate driver 400, and a signal controller 600 controlling the data driver 500 and the gate driver 400, as illustrated in FIG. 1.

The display panel 300 includes a plurality of gate lines G1-Gn and a plurality of data lines D1-Dm. The plurality of gate lines G1-Gn is extended in a horizontal direction, and the plurality of data lines D1-Dm is extended in a vertical direction while crossing the plurality of gate lines G1-Gn. Further, reference voltage lines V1-Vm extended in a vertical direction are positioned between the plurality of data lines D1-Dm. The reference voltage lines V1-Vm also cross, and are insulated from, the gate lines G1-Gn.

One gate line and one data line are connected with one pixel area PX. The pixel areas PX are arranged in a matrix form, and elongated in a horizontal direction which the direction that the gate lines G1-Gn extend. The gate lines G1-Gn and long axis of the pixel areas PX are horizontal with respect to the image displayed to the viewer on display panel 300 such that the top row of pixel areas PX in the display panel 300 corresponds to a top side of the display panel 300 with respect to a viewer viewing and image on the display panel 300. Such a horizontal pixel area PX may include one thin film transistor, a liquid crystal capacitor, and a storage capacitor.

A control terminal of the thin film transistor may be connected to one of the gate lines G1-Gn, an input terminal of the thin film transistor may be connected to one of the data lines D1-Dm, and an output terminal of the thin film transistor may be connected to one terminal (pixel electrode) of the liquid crystal capacitor or one terminal of the storage capacitor. The other terminal of the liquid crystal capacitor is connected to the common electrode, and the other terminal of the storage capacitor may receive a storage voltage Vcst.

The reference voltage lines V1-Vm provide a reference voltage to the pixel areas PX. The reference voltage has a voltage level which is not changed with time. However, according to an exemplary embodiment, the reference voltage may have a changed voltage level within different subpixels of the same pixel, as described in more detail below.

In the liquid crystal display device according to the exemplary embodiment, one data line is connected to the plurality of pixel areas PX positioned at one side. That is, one data line is connected with the pixel areas disposed in the same column. Further, similarly, one gate line is connected with all of the pixel areas PX in one row.

The signal controller 600 responds to input data inputted from the outside of the display panel and control signals thereof, for example, a vertical synchronization signal Vsync, a horizontal synchronization signal Hsync, a main clock signal MCLK, and a data enable signal DE, to process the input data and control signals so as to be suitable for an operation condition of the liquid crystal panel 300. The signal controller then generates and outputs image data DAT, a gate control signal CONT1, a data control signal CONT2, and a clock signal.

The gate control signal CONT1 may include a vertical synchronization start signal STV instructing an output start of a gate-on voltage Von, a gate clock signal CPV controlling an output start of the gate-on voltage Von, and the like.

The data control signal CONT2 may include a horizontal synchronization start signal STH instructing input start of the image data DAT, a load signal TP instructing a corresponding data voltage to be applied to the data lines D1-Dm, and the like.

The plurality of gate lines G1-Gn of the display panel 300 are connected with the gate driver 400, and the gate driver 400 sequentially applies gate-on voltages Von to the gate lines G1-Gn according to the gate control signal CONT1 applied from the signal controller 600.

The gate-off voltage Voff is applied in a period where the gate-on voltage Von is not applied to the gate lines G1-Gn.

The plurality of data lines D1-Dm of the display panel 300 are connected with the data driver 500, and the data driver 500 receives the data control signal CONT2 and the image data DAT from the signal controller 600. The data driver 500 converts an image data DAT into a data voltage by using a gray voltage generated in a gray voltage generator (not illustrated) to transfer the converted data voltage to the data lines D1-Dm. The data voltage includes a data voltage having a positive polarity and a data voltage having a negative polarity. The data voltage having a positive polarity and the data voltage having a negative polarity are alternately applied based on a frame, a row, or a column to be reversely driven. The reverse driving is applied to both displaying a motion picture and displaying a still image.

According to an exemplary embodiment, the display device may have various pixel connection structures which are not illustrated in FIG. 1.

Figure 2:
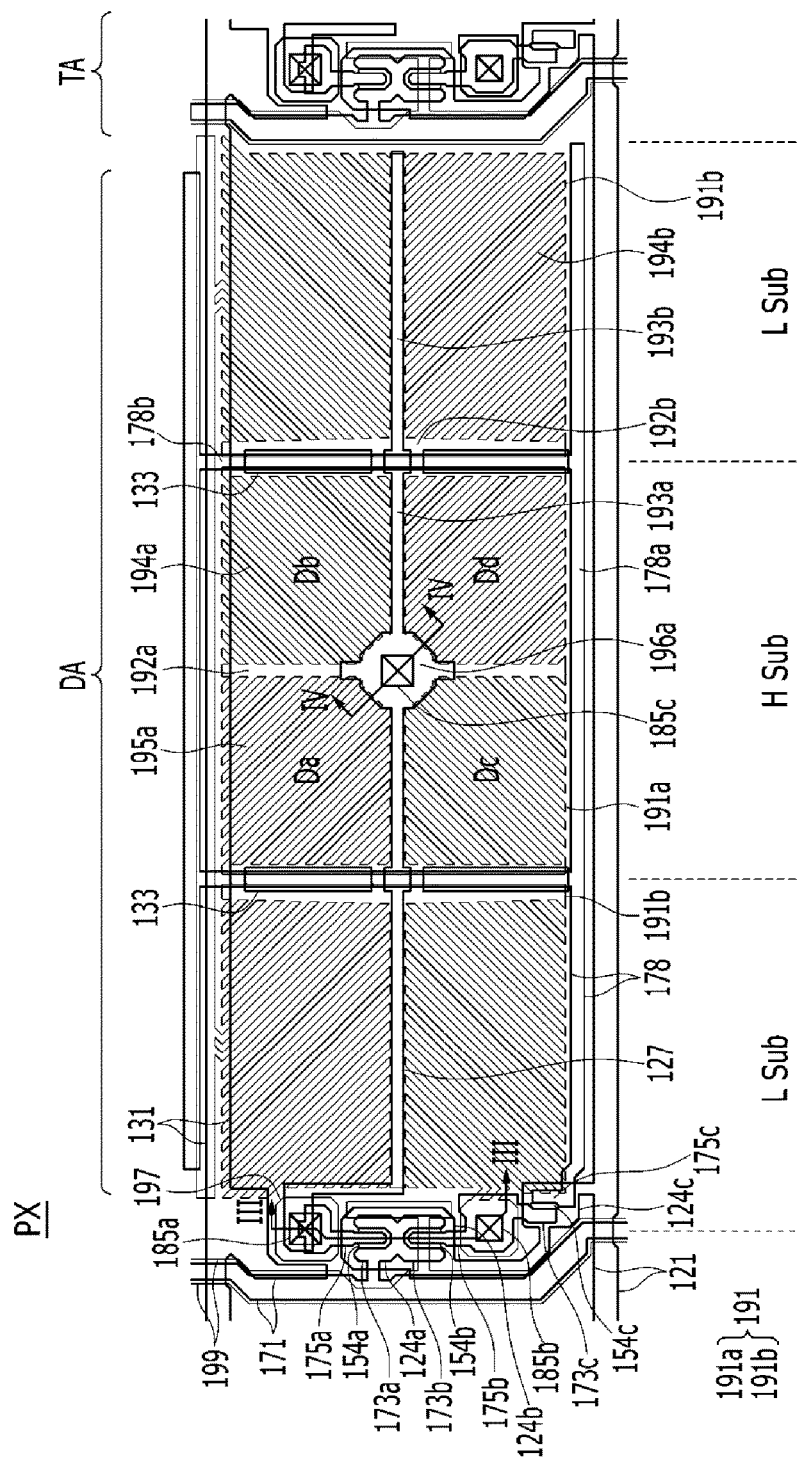
FIG. 2 is a plan layout view of one pixel according to the exemplary embodiment.
Figure 3:
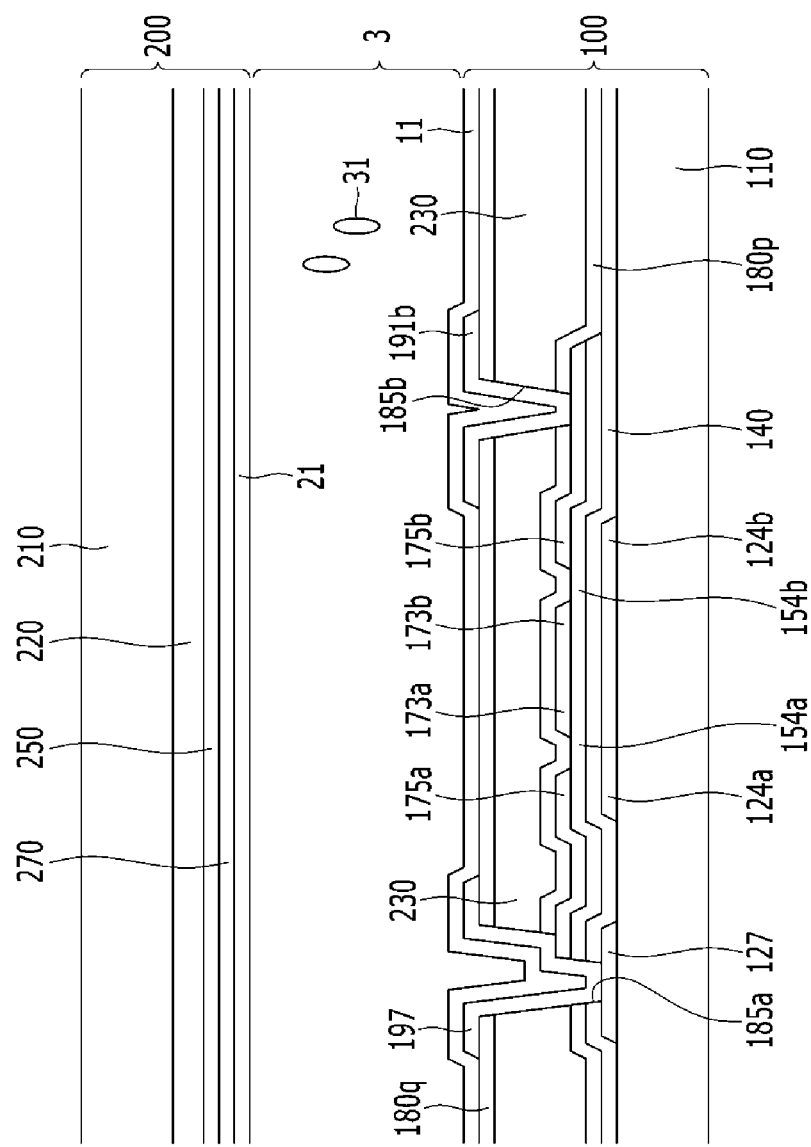
FIG. 3 is a cross-sectional view of FIG. 2 taken along line
Figure 4:
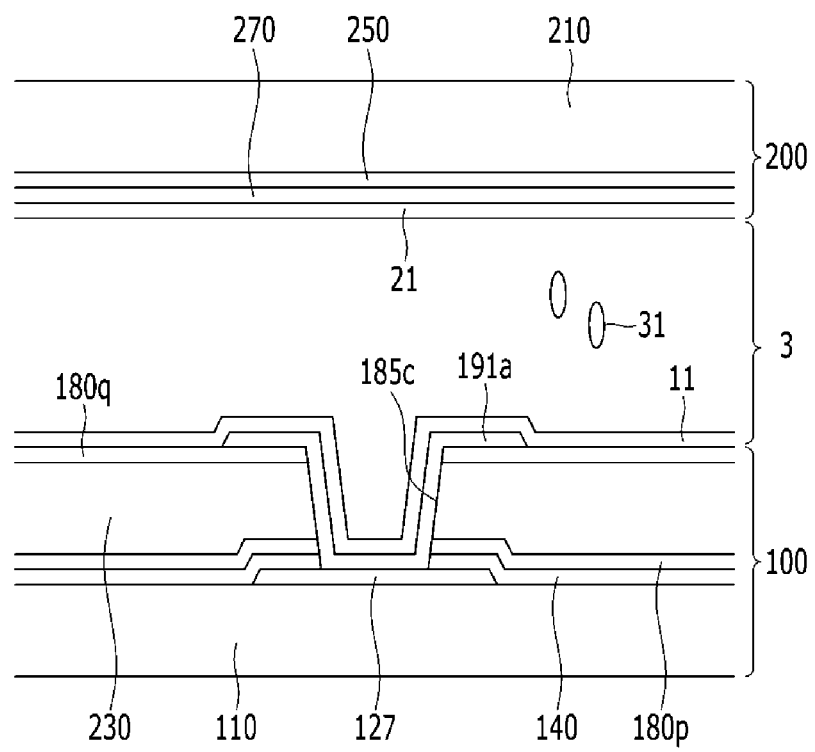
FIG. 4 is a cross-sectional view of FIG. 2 taken along line IV-IV.

Hereinafter, one pixel area according to the exemplary embodiment will be described with reference to FIGS. 2 to 4. FIG. 2 is a plan layout view of one pixel according to the exemplary embodiment, FIG. 3 is a cross-sectional view of FIG. 2 taken along line III-III, and FIG. 4 is a cross-sectional view of FIG. 2 taken along line IV-IV.

First, referring to FIG. 2, one pixel area PX according to the exemplary embodiment is a horizontal pixel which is elongated in a horizontal direction. The horizontal pixel area PX includes a thin film transistor formation area TA and a display area DA. In the display area DA, a pixel electrode is positioned, and an image is displayed by liquid crystal molecules positioned in the display area DA. In the thin film transistor formation area TA, an element such as a thin film transistor and a line which transfer a voltage to be applied to the pixel electrode of the display area DA are positioned.

The display area DA is largely divided into three subpixel areas, and may include one high-gray subpixel area H sub and two low-gray subpixel areas L sub as an exemplary embodiment. One high-gray subpixel area H sub is positioned at the center of one pixel area, and the two low-gray subpixel areas L sub are positioned at both sides (left and right sides) of one high-gray subpixel area H sub. However, the present disclosure is not limited to the aforementioned exemplary embodiment, and the display area DA may include two high-gray subpixel areas and one low-gray subpixel area. As such, modifiable exemplary embodiments will be described below.

First, the lower panel 100 will be described. A plurality of gate lines 121 is positioned on a first insulation substrate 110.

The gate line 121 mainly extends along a row direction (first direction) which is a horizontal direction, and includes a first gate electrode 124a, a second gate electrode 124b, and a third gate electrode 124c, which protrude upward from the gate line 121. The gate line 121 is extended or expanded upward to form the third gate electrode 124c and extended from the third gate electrode 124c again to form the first gate electrode 124a and the second gate electrode 124b. The first gate electrode 124a and the second gate electrode 124b may be positioned in one extended area.

The storage electrode line 131 positioned at the upper side of the gate line 121 may be positioned in parallel with the gate line 121 in a row direction, and overlap with ends of minute branches of the first subpixel electrode 191a and the second subpixel electrode 191b and/or a connecting portion of the second subpixel electrode 191b. The storage electrode line 131 may include an extended area protruding and extended downward from the thin film transistor formation area TA.

The storage electrode line 131 having a rod shape is extended in a column direction by deviating from one pixel area to be connected with another layer or an external driving circuit.

The storage electrode 131 may be made of the same material as the gate line 121 and may be simultaneously formed with the gate line 121.

A connection signal line 127 may be positioned between the storage electrode line 131 and the gate line 121 which are positioned in one pixel area. The connection signal line 127 may be simultaneously formed through the same process with the gate line 121 and the storage electrode line 131 and made of the same material as the gate line 121 and the storage electrode line 131.

The connection signal line 127 transverses one pixel area in the extending direction of the gate line, and particularly, overlaps with horizontal stems 193a and 193b of the first subpixel electrode 191a and the second subpixel electrode 191b. The same luminance may be provided with respect to the entire pixel area through the connection signal line 127 which symmetrically overlaps with the second subpixel electrodes 191b positioned at the left and right sides of the first subpixel electrode 191a.

The connection signal line 127 may have a region expanded from a first contact hole 185a connected with a first drain electrode 175a and a third contact hole 185c connected with the first subpixel electrode 191a. In this case, the region expanded from the third contact hole 185c may have a planar shape which is the same as or similar to an extension of the first subpixel electrode 191a to be described below.

The connection signal line 127 is connected with the first drain electrode 175a and the first subpixel electrode 191a in the first contact hole 185a and the third contact hole 185c and transfers a voltage applied to the first drain electrode 175a to the first subpixel electrode 191a.

A dummy electrode pattern 133 may be positioned to overlap with a gap between the first subpixel electrode 191a and the second subpixel electrode 191b or vertical stems 192a and 192b of the first subpixel electrode 191a and the second subpixel electrode 191b.

Further, the dummy electrode pattern 133 may overlap with a vertical portion of a reference voltage line to be described below and have a rod shape extended in the row direction to overlap with a planar pattern of the vertical portion. A width of the dummy electrode pattern 133 may be slightly larger than that of the vertical portion of the reference voltage line. The dummy electrode pattern 133 is not connected with the storage electrode line 131, the gate line 121, or the like.

The dummy electrode pattern 133 may serve to block light incident from a backlight unit (not illustrated) to block light incident to the reference voltage line.

The dummy electrode pattern 133 is positioned on the same layer as the gate line 121 and the storage electrode line 131 and may be simultaneously formed through the same process. Further, the dummy electrode pattern 133 may be made of the same material as the gate line 121 and the storage electrode line 131. A gate insulating layer 140 is positioned on a layer where the gate line 121 and the storage electrode line 131 are positioned and may be made of an inorganic material such as silicon nitride.

A first semiconductor layer 154a, a second semiconductor layer 154b, and a third semiconductor layer 154c are positioned on the gate insulating layer 140 and overlap with the first gate electrode 124a, the second gate electrode 124b, and the third gate electrode 124c. According to an exemplary embodiment, the semiconductor layers 154a, 154b, and 154c may be amorphous silicon, polysilicon, or an oxide semiconductor.

A data conductor including a data line 171 including a first source electrode 173a and a second source electrode 173b, a first drain electrode 175a, a second drain electrode 175b, a third source electrode 173c extended from the second drain electrode 175b, and a reference voltage line 178 including the third drain electrode 175c is positioned on the first semiconductor layer 154a, the second semiconductor layer 154b, and the third semiconductor layer 154c and on the gate insulating layer 140.

The data line 171 extends along a column direction (second direction) which is a vertical direction and includes a first source electrode 173a and a second source electrode 173b which extend toward the first and second gate electrodes 124a and 124b, respectively. In this case, the row direction (first direction) is perpendicular to the column direction (second direction). In a matrix, the standard is that the row is the horizontal direction and the column is the vertical direction.

The first source electrode 173a and the second source electrode 173b may have a U shape, and the first drain electrode 175a and the second drain electrode 175b may have an I shape facing the U shape. The second drain electrode 175b is extended to form the third source electrode 173c.

The reference voltage line 178 may include a horizontal portion 178a which is substantially parallel with the gate line 121 and a vertical portion 178b which extends from the horizontal portion 178a to be substantially parallel with the data line 171.

The horizontal portion 178a is extended to the thin film transistor formation area TA along the outside of the display area, and one end of the horizontal portion 178a is extended to form the third drain electrode 175c. The vertical portion 178b is positioned at the gap between the first subpixel electrode 191a and the second subpixel electrode 191b and may overlap with the dummy electrode pattern 133 positioned on the gate line 121 layer.

The first gate electrode 124a, the first source electrode 173a, and the first drain electrode 175a form a first thin film transistor together with the first semiconductor layer 154a. The second gate electrode 124b, the second source electrode 173d, and the second drain electrode 175b form a second thin film transistor together with the second semiconductor layer 154b. The third gate electrode 124c, the third source electrode 173c, and the third drain electrode 175c form the third thin film transistor Qc together with the third semiconductor layer 154c.

A first passivation layer 180p is positioned on the data conductor, and a color filter 230 is positioned thereon. The first passivation layer 180p may include an inorganic insulating layer such as silicon nitride or silicon oxide. The first passivation layer 180p may prevent a pigment of the color filter 230 from flowing into the semiconductor layers 154a, 154b, and 154c.

The color filter 230 may uniquely display one of the primary colors, and an example of the primary colors may include three primary colors of red, green, and blue or yellow, cyan, magenta, and the like. Although not illustrated, the color filter 230 may further include a color filter 230 which displays a mixed color of the primary colors or a white color in addition to the primary colors.

The second passivation layer 180q is positioned on the color filter 230 and may be formed of the same material as the first passivation layer 180p. The second passivation layer 180q may prevent impurities from flowing into the liquid crystal layer 3 due to the color filter 230 and the like.

A second passivation layer 180q is positioned on the pixel electrode 191. The pixel electrode 191 according to the exemplary embodiment has a shape in which a horizontal side is longer than a vertical side, and includes a first subpixel electrode 191a and a second subpixel electrode 191b which are adjacent to each other along a row direction.

The pixel electrode 191 may be made of a transparent material such as ITO and IZO. The pixel electrode 191 may be made of a transparent conductive material such as ITO or IZO or a reflective metal such as aluminum, silver, chromium, or an alloy thereof.

A connection bridge 197 may be formed of the same material as the pixel electrode through the same process. Particularly, the connection bridge 197 is positioned in the first contact hole 185a to connect the connection signal line 127 and the first drain electrode 175a.

An auxiliary signal line 199 has substantially the same planar shape as the data line 171 and is connected with the data line 171 outside of the display area to receive a voltage applied to the data line 171. As a result, resistance applied to the data line 171 may be reduced and a display device having better quality may be provided.

The auxiliary signal line 199 is made of the same material as the pixel electrode 191 and may be positioned on the same layer through a simultaneous process with the pixel electrode 191.

Hereinafter, the pixel electrode 191 according to the exemplary embodiment will be described in detail.

The pixel electrode 191 includes one first subpixel electrode 191a and two second subpixel electrodes 191b positioned at both left and right sides of the first subpixel electrode 191a.

According to an exemplary embodiment, the first subpixel electrode 191a is a high-gray subpixel area to which a high gray is applied, and the second subpixel electrode 191b is a low-gray subpixel area to which a low gray is applied.

As illustrated in FIG. 2, the overall shape of the first subpixel electrode 191a is a quadrangle, and the first subpixel electrode 191a includes a cross stem configured by a first horizontal stem 193a and a first vertical stem 192a orthogonal to the first horizontal stem 193a at the center of the first horizontal stem 193a. The first subpixel electrode 191a also includes a first minute branch 194a extended from the cross stem.

In this case, a central region where the first horizontal stem 193a and the first vertical stem 192a cross each other includes an extension 196a with a wide area. A planar shape of the extension 196a may be any one of polygons and similar polygons. Here, the term "similar polygon" means a shape which is entirely similar to a virtual polygon but of which at least one side is not a straight line. The term "virtual side" is used for describing a modified shape because the extension 196a according to another exemplary embodiment has a modified shape (that is, a similar polygon) from the virtual polygon, but not an exact polygon. As an example, the planar shape of the extension 196a may be a similar octagon as illustrated in FIG. 2 to effectively control alignment of liquid crystal molecules positioned to be adjacent to the extension 196a.

The first subpixel electrode 191a includes a first domain Da, a second domain Db, a third domain Dc, and a fourth domain Dd which are divided based on the first horizontal stem 193a and the first vertical stem 192a. The first subpixel electrode 191a also includes a plurality of first minute branches 194a extended from the first horizontal stem 193a and the first vertical stem 192a and that are positioned in the first to fourth domains Da, Db, Dc, and Dd. A first minute slit 195a is positioned between the first minute branches 194a in a quadrangular shape of a basic electrode. That is, the first minute slit 195a is a region where a conductor forming the cross stem and the first minute branch is removed and a gap between the adjacent first minute branches 194a.

The first minute branch 194a forms an angle of approximately 45° or 135° with the gate line 121 or the first horizontal stem 193a. Further, the first minute branches 194a of two adjacent domains Da, Db, Dc, and Dd may be perpendicular to each other.

The side of the first minute branch 194a makes a horizontal component which determines a tilt direction of the liquid crystal molecules 31 by distorting an electric field. The horizontal component of the electric field is substantially horizontal to the side of the first minute branch 194a. Accordingly, the liquid crystal molecules 31 are tilted in a parallel direction to a longitudinal direction of the minute branch 194a. Because the first subpixel electrode 191a includes four domains Da-Dd having different longitudinal directions of the minute branches 194a, the tilt directions of the liquid crystal molecules 31 are approximately four directions, and four domains in which alignment directions of the liquid crystal molecules 31 are different from each other are formed in the liquid crystal layer 3. As such, a reference viewing angle of the liquid crystal display device is increased by varying the tilt directions of the liquid crystal molecules 31.

In summary, the first subpixel electrode 191a with the high gray includes four regions in which the alignment directions of the liquid crystal molecules 31 are divided according to the extending direction of the first minute branches 194a.

The first drain electrode 175a of the first thin film transistor is connected with the first subpixel electrode 191a with the high gray through the first contact hole 185a.

In detail, referring to FIGS. 2 to 4, the first subpixel electrode 191a and the first drain electrode 175a are connected to each other through the connection signal line 127 positioned on the same layer as the gate line 121. The connection signal line 127 is connected with the first drain electrode 175a through the first contact hole 185a, and the connection signal line 127 transverses the pixel area and is connected with the first subpixel electrode 191a through the third contact hole 185c positioned in the first subpixel electrode 191a. Accordingly, the voltage applied to the first drain electrode 175a is applied to the first subpixel electrode 191a along the connection signal line 127. That is, the first drain electrode 175a and the first subpixel electrode 191a are electrically connected to each other through the connection signal line 127.

The second subpixel electrode 191b includes a second horizontal stem 193b, a second vertical stem 192b which is orthogonal to an end of the second horizontal stem 193b, and a plurality of second minute branches 194b extended from the second horizontal stem 193b and the second vertical stem 192b.

The second horizontal stem 193b is positioned to transverse the center of one pixel area and may overlap with the aforementioned connection signal line 127. The second vertical stem 192b is positioned perpendicular to one end of the second horizontal stem 193b and may be parallel with the vertical portion 178b and the like of the reference voltage line 178. According to the exemplary embodiment, in the second subpixel electrode 191b positioned at the left side of the first subpixel electrode 191a, the second vertical stem 192b is positioned at the right side, and in the second subpixel electrode 191b positioned at the right side of the first subpixel electrode 191a, the second vertical stem 192b may be positioned at the left side. The alignment directions of the liquid crystal molecules may be divided based on the second horizontal stem and the second vertical stem, and the exemplary embodiment is divided into two regions.

The second subpixel electrode 191b positioned at the left side of the first subpixel electrode 191a includes a second minute branch 194b extended in the same direction as the first minute branch 194a positioned in the first domain Da and a second minute branch 194b extended in the same direction as the first minute branch 194a positioned in the third domain Dc.

That is, the second subpixel electrode 191b positioned at the left side of the first subpixel electrode 191a includes a second minute branch 194b extended in an upper left direction and a second minute branch 194b extended in a lower left direction. The directions of the second minute branches 194b are the same extending direction of the first minute branches 194a positioned in the first domain and the third domain, respectively, and are parallel to each other.

As a result, the alignment directions of the liquid crystal molecules aligned by the first subpixel electrode 191a and the liquid crystal molecules aligned by the adjacent second subpixel electrode 191b may be the same as each other. The display device according to an exemplary embodiment is curved, such that the first substrate 110 and second substrate 210 are curved. When a display device is curved, the upper and lower panels may be misaligned, which can cause distortion or a texture or a dark portion. However, the alignment of the liquid crystal molecules of a display panel of the present disclosure is not distorted to control generation of a texture or a dark portion.

Similarly, the second subpixel electrode 191b positioned at the right side of the first subpixel electrode 191a includes a second minute branch 194b extended in the same direction as the first minute branch 194a positioned in the second domain Db, and a second minute branch 194b extended in the same direction as the first minute branch 194a positioned in the fourth domain Dd. That is, the second subpixel electrode 191b positioned at the right side of the first subpixel electrode 191a includes a second minute branch 194b extended in an upper right direction and a second minute branch 194b extended in a lower right direction. The directions of the second minute branches 194b are the same extending directions of the first minute branches 194a positioned in the second domain Db and the fourth domain Dd, respectively, and are parallel to each other.

As a result, the alignment directions of the liquid crystal molecules aligned by the first subpixel electrode 191a and the liquid crystal molecules aligned by the adjacent second subpixel electrode 191b may be the same as each other. Accordingly, the display device according to the exemplary embodiment is curved, and as a result, even in the case where the upper and lower panels are misaligned, the same alignment of the liquid crystal molecules controls generation of a texture or a dark portion.

In summary, the first subpixel electrode 191a and the second subpixel electrode 191b include four and two regions according to the alignment of the liquid crystal molecules 31, respectively. In this case, two regions of the first subpixel electrode 191a and two regions of the adjacent second subpixel electrode 191b have the same alignment direction of the liquid crystal molecules.

Further, according to an exemplary embodiment, two second subpixel electrodes 191b may be connected to each other through a connecting portion overlapping with the storage electrode line 131 to receive the same voltage. Although alternative connections are not illustrated, the second subpixel electrodes 191b may be connected to each other by any shape or method.

The second subpixel electrode 191b is physically and electrically connected with the second drain electrode 175b through the second contact hole 185b and receives a data voltage from the second drain electrode 175b. In this case, a part of the data voltage applied to the second drain electrode 175b is divided through the third source electrode 173c, and a magnitude of the voltage applied to the first subpixel electrode 191a is larger than that of the voltage applied to the second subpixel electrode 191b.

The first subpixel electrode 191a and the second subpixel electrode 191b to which the data voltages are applied generate an electric field together with a common electrode 270 of the upper panel 200 (FIGS. 3 and 4) to determine alignment directions of the liquid crystal molecules 31 of the liquid crystal layer 3 between the two electrodes 191 and 270. Luminance of light passing through the liquid crystal layer 3 varies according to the alignment directions of the liquid crystal molecules 31 determined above.

As illustrated in FIG. 2, each pixel area PX has bilateral symmetry, and the adjacent pixel areas PX receive data voltages having different polarities. As a result, because the high-gray subpixel areas exist at upper and lower sides of the high-gray subpixel area and the low-gray subpixel areas exist at upper and lower sides of the low-gray subpixel area, the high-gray subpixel areas and the low-gray subpixel areas are arranged in a column, and as a result, a difference in luminance is not generated and vertical spots are not viewed by a user. The reference voltage line V also has symmetry with respect to one pixel area PX to be divided so that display luminance is constant at the left and right of the pixel area PX, and thus the display quality may be constant at the left and right sides.

A lower alignment layer 11 is positioned on the pixel electrode 191.

Next, the upper panel 200 will be described.

A light blocking member 220 is positioned on a second insulation substrate 210. The light blocking member 220 is called a black matrix BM and blocks light leakage. The light blocking members 220 may be positioned in a region corresponding to the data line 171 and even in a region corresponding to the gate line 121. That is, an exemplary embodiment may provide the light blocking members 220 formed in a matrix pattern.

An overcoat 250 is positioned on the light blocking member 220. The overcoat 250 may be made of an organic insulating material and provides a flat surface. In an exemplary embodiment, the overcoat 250 may be omitted.

The common electrode 270 is positioned on the overcoat 250 and receives a common voltage. The common electrode 270 may be made of a transparent conductor material such as ITO and IZO.

An upper alignment layer 21 is positioned on the common electrode 270.

The liquid crystal layer 3 includes a plurality of liquid crystal molecules 31, the liquid crystal molecules 31 are aligned to be vertical (perpendicular) to the surfaces of the two substrates 110 and 210 and aligned to have pretilts which are tilted in the same direction as a longitudinal direction of the cutout pattern of the pixel electrode 191 while the voltages are not applied to the two field generating electrodes 191 and 270.

When the data voltage is transferred to the pixel area PX, the data voltage is applied to the first subpixel electrode 191a with the high gray as it is through the first thin film transistor. On the other hand, the data voltage applied through the second thin film transistor and an intermediate voltage of the reference voltage transferred through the third thin film transistor are applied to the second subpixel electrode 191b with the low gray. As a result, the voltages having different levels are applied to the first subpixel electrode 191a with the high gray and the second subpixel electrode 191b with the low gray.

The pixel electrodes 191a and 191b with the high gray and the low gray to which the data voltages having different levels are applied generate the electric field in the liquid crystal layer 3 together with the common electrode 270 of the upper panel 200 to determine the directions of the liquid crystal molecules 31 of the liquid crystal layer 3 between the two electrodes. In this case, the tilt direction of the liquid crystal molecules 31 may be determined to be parallel to the extending direction of the minute branches.

According to an exemplary embodiment, the alignment direction of the liquid crystal molecules aligned by the first subpixel electrode and the alignment direction of the liquid crystal molecules aligned by the second subpixel electrode are the same as each other. Accordingly, even in the case where the misalignment of the upper and lower substrates occurs due, for example, to the curving of the display device, the alignment of the liquid crystal molecules is the same to control the generation of the texture or the dark portion. As a result, luminance improvement may be also provided.

Figure 5:
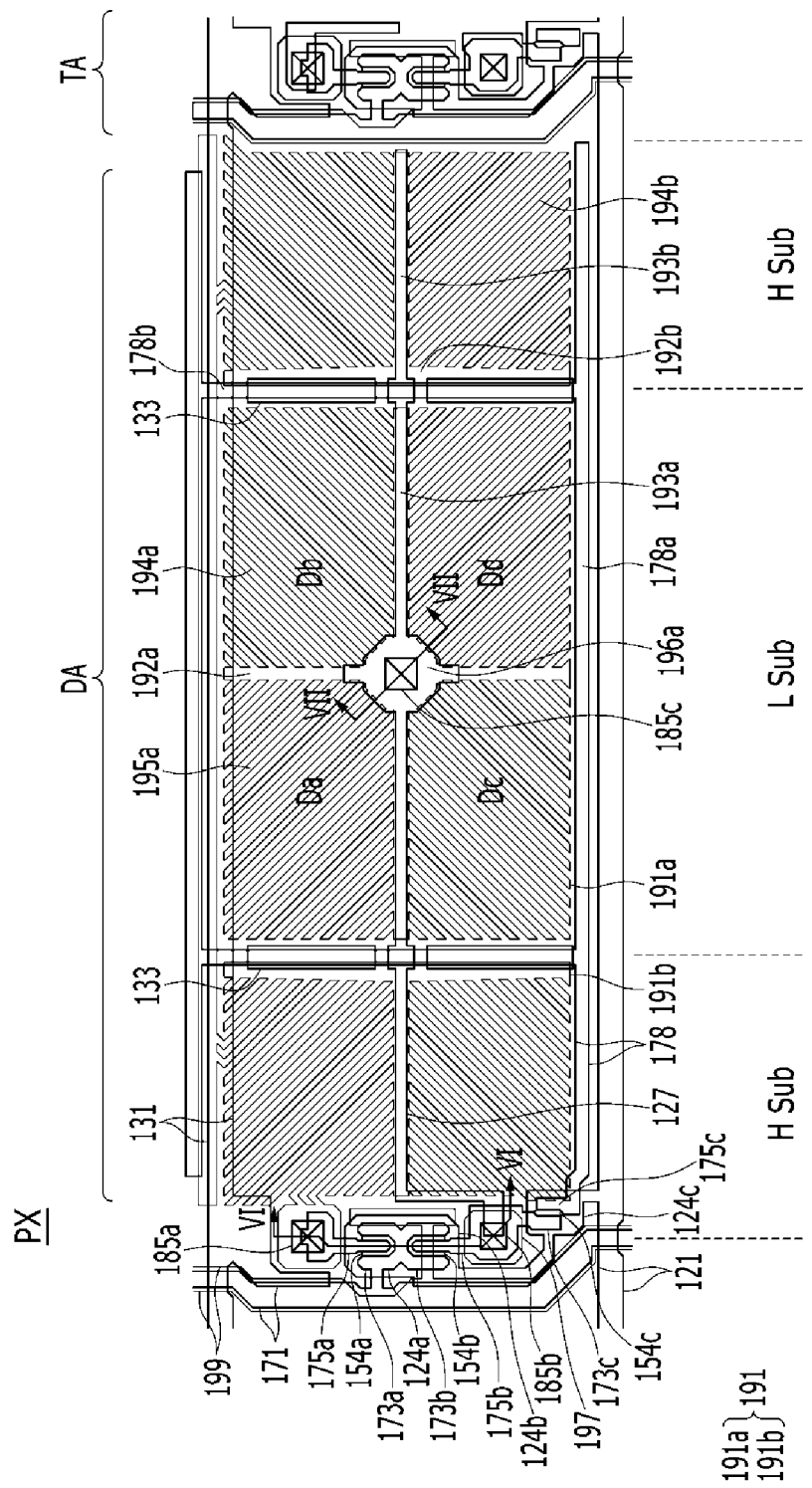
FIG. 5 is a plan layout view of one pixel according to another exemplary embodiment.
Figure 6:
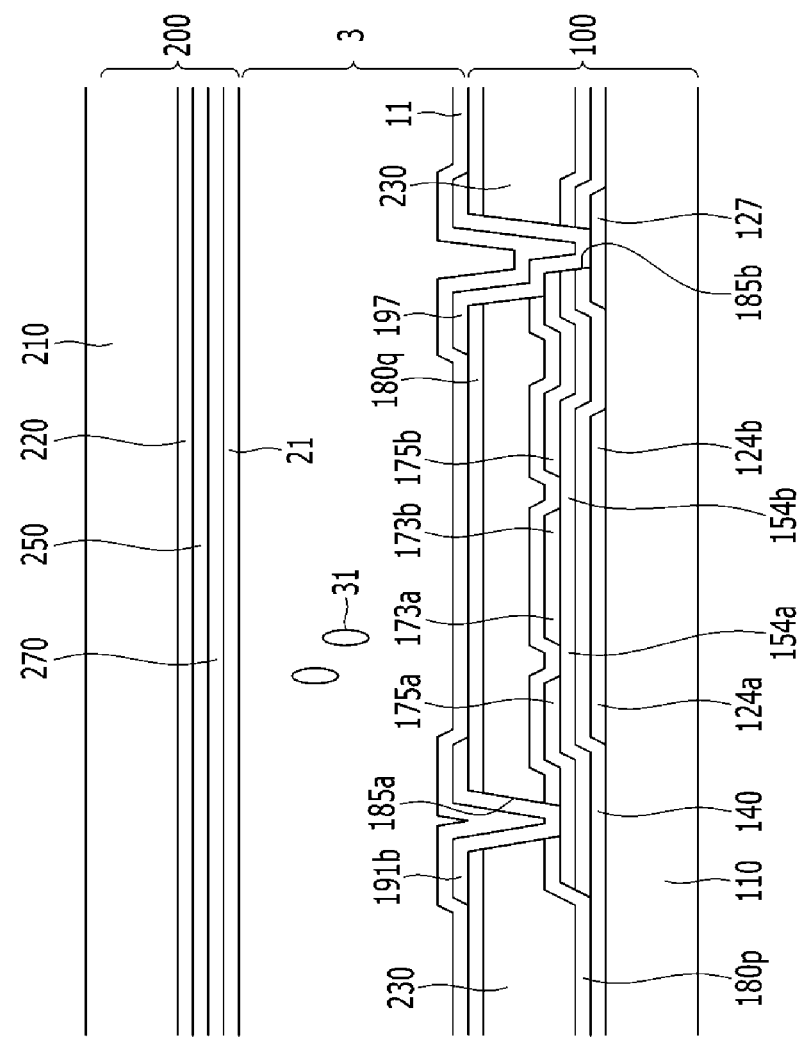
FIG. 6 is a cross-sectional view of FIG. 5 taken along line VI-VI.
Figure 7:
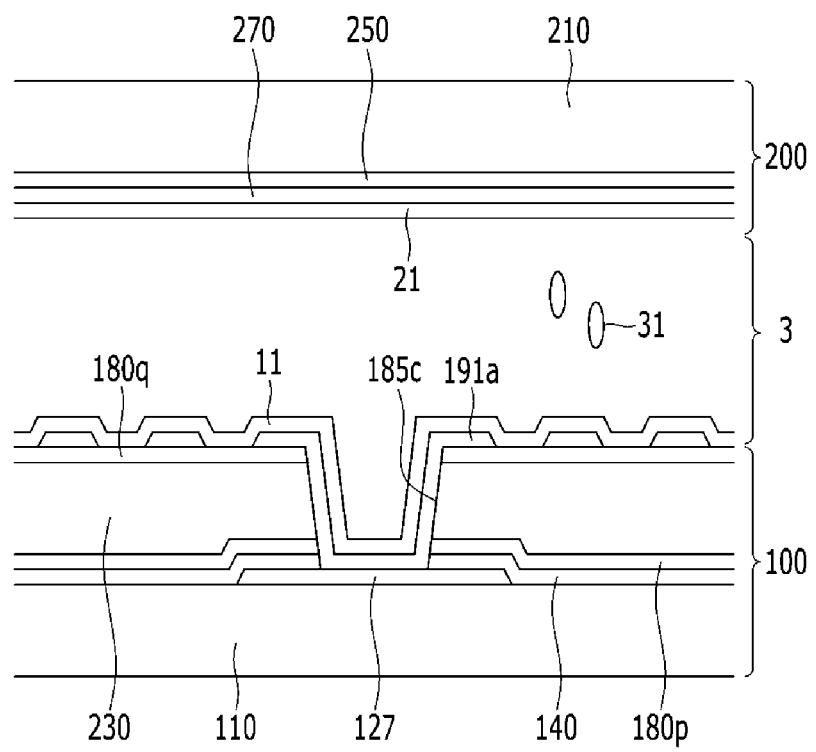
FIG. 7 is a cross-sectional view of FIG. 5 taken along line VII-VII.

Hereinafter, a pixel area according to another exemplary embodiment will be described with reference to FIGS. 5 to 7. The description for the same or similar constituent elements as or to the constituent elements described above will be omitted. FIG. 5 is a plan layout view of one pixel according to another exemplary embodiment, FIG. 6 is a cross-sectional view of FIG. 5 taken along line VI-VI, and FIG. 7 is a cross-sectional view of FIG. 5 taken along line VII-VII.

Referring to FIG. 5, one pixel area PX according to another exemplary embodiment is a horizontal pixel which is elongated in a horizontal direction. The display area DA is largely divided into three subpixel areas, and may include one low-gray subpixel area L sub and two high-gray subpixel areas H sub. One low-gray subpixel area L sub is positioned at the center, and the two high-gray subpixel areas H sub are positioned at both sides (left and right sides) of one low-gray subpixel area L sub. In this case, the low-gray subpixel area L sub may be larger than the entire area of the high-gray subpixel areas H sub.

A connection signal line 127 according to another exemplary embodiment may be positioned between the storage electrode line 131 and the gate line 121 which are positioned in one pixel area.

The connection signal line 127 may have a region expanded from a second contact hole 185b connected with a second drain electrode 175b and a third contact hole 185c connected with the first subpixel electrode 191a through the connection bridge 197. In this case, the region expanded from the third contact hole 185c may have a planar shape which is the same as or similar to an extension of the first subpixel electrode 191a to be described below.

The connection signal line 127 is connected with the second drain electrode 175b and the first subpixel electrode 191a in the second contact hole 185b and the third contact hole 185c, respectively, and particularly transfers a voltage applied to the second drain electrode 175b to the first subpixel electrode 191a with the low gray through the connection bridge 197.

Hereinafter, a shape of the pixel electrode 191 according to another exemplary embodiment will be described in detail.

The pixel electrode 191 includes one first subpixel electrode 191a and two second subpixel electrodes 191b positioned at both left and right sides of the first subpixel electrode 191a.

According to another exemplary embodiment, the first subpixel electrode 191a is a low-gray subpixel area to which a low gray is applied, and the second subpixel electrode 191b is a high-gray subpixel area to which a high gray is applied.

As illustrated in FIG. 5, the overall shape of the first subpixel electrode 191a is a quadrangle, and the first subpixel electrode 191a includes a cross stem configured by a first horizontal stem 193a and a first vertical stem 192a orthogonal to the first horizontal stem 193a at the center of the first horizontal stem 193a.

In this case, a central region where the first horizontal stem 193a and the first vertical stem 192a cross each other includes an extension 196a with a wide area. In this case, the planar shape of the extension 196a may be any one of polygons and similar polygons. Here, the term "similar polygon" means a shape which is entirely similar to a virtual polygon but of which at least one side is not a straight line. The term "virtual side" is used for describing a modified shape because the extension 196a according to another exemplary embodiment has a modified shape (that is, a similar polygon) from the virtual polygon, not an accurate polygon. As an example, the planar shape of the extension 196a may be a similar octagon as illustrated in FIG. 5 to effectively control alignment of liquid crystal molecules positioned to be adjacent to the extension 196a.

Further, the first subpixel electrode 191a includes a first domain Da, a second domain Db, a third domain Dc, and a fourth domain Dd which are divided based on the first horizontal stem 193a and the first vertical stem 192a, and a plurality of first minute branches 194a extended from the first horizontal stem 193a and the first vertical stem 192a is positioned at the first to fourth domains Da, Db, Dc, and Dd. A first minute slit 195a is positioned between the first minute branches 194a in a quadrangular shape of a basic electrode.

That is, the first minute slit 195a is a region where a conductor forming the cross stem and the first minute branch is removed and a gap between the adjacent first minute branches 194a.

The side of the first minute branch 194a makes a horizontal component which determines a tilt direction of the liquid crystal molecules 31 by distorting an electric field. The horizontal component of the electric field is substantially horizontal to the side of the first minute branch 194a. Accordingly, the liquid crystal molecules 31 are tilted in a parallel direction to a longitudinal direction of the minute branch 194a. Because the first subpixel electrode 191a includes four domains Da-Dd in which length directions of the first minute branches 194a are different from each other, the tilt directions of the liquid crystal molecules 31 are approximately four, and four domains in which alignment directions of the liquid crystal molecules 31 are different from each other are formed in the liquid crystal layer 3. As such, a reference viewing angle of the liquid crystal display device is increased by varying the tilt directions of the liquid crystal molecules.

In summary, the first subpixel electrode 191a with the low gray includes four regions in which the alignment directions of the liquid crystal molecules 31 are divided according to the extending direction of the first minute branch 194a.

The second subpixel electrode 191b includes a second horizontal stem 193b, a second vertical stem 192b which is orthogonal to an end of the second horizontal stem 193b, and second minute branches 194b extended from the second horizontal stem 193b and the second vertical stem 192b. One second subpixel electrode 191b includes two regions of which the alignment directions of the liquid crystal molecules 31 are divided based on the second vertical stem 192b and the second horizontal stem 193b that transverses the second vertical stem 192b.

Further, according to an exemplary embodiment, two second subpixel electrodes 191b may be connected to each other through a connecting portion to receive the same voltage.

The second subpixel electrode 191b positioned at the left side of the first subpixel electrode 191a includes a second minute branch 194b extended in the same direction as the first minute branch 194a positioned in the first domain Da and a second minute branch 194b extended in the same direction as the first minute branch 194a positioned in the third domain Dc.

That is, the second subpixel electrode 191b positioned at the left side of the first subpixel electrode 191a includes a second minute branch 194b extended in an upper left direction and a second minute branch 194b extended in a lower left direction. The directions of the second minute branches 194b are the same extending direction of the first minute branches 194a positioned in the first domain and the third domain, respectively, and are parallel to each other.

As a result, the alignment directions of the liquid crystal molecules aligned by the first subpixel electrode 191a and the liquid crystal molecules aligned by the adjacent second subpixel electrode 191b may be the same as each other. Accordingly, when the display device according to an exemplary embodiment is curved, even in the case where the upper and lower panels are misaligned, the alignment of the liquid crystal molecules is not distorted to control generation of a texture or a dark portion.

Similarly, the second subpixel electrode 191b positioned at the right side of the first subpixel electrode 191a includes a second minute branch 194b extended in the same direction as the first minute branch 194a positioned in the second domain Db and a second minute branch 194b extended in the same direction as the first minute branch 194a positioned in the fourth domain Dd. That is, the second subpixel electrode 191b positioned at the right side of the first subpixel electrode 191a includes a second minute branch 194b extended in an upper right direction and a second minute branch 194b extended in a lower right direction. The directions of the second minute branches 194b are the same extending direction of the first minute branches 194a positioned in the second domain Db and the fourth domain Dd, respectively, and are parallel to each other.

As a result, the alignment directions of the liquid crystal molecules aligned by the first subpixel electrode 191a and the liquid crystal molecules aligned by the adjacent second subpixel electrode 191b may be the same as each other. Accordingly, when the display device according to an exemplary embodiment is curved, and as a result, even in the case where the upper and lower panels are misaligned, the alignment of the liquid crystal molecules is not distorted to control generation of a texture or a dark portion.

The second subpixel electrode 191b is physically and electrically connected with the first drain electrode 175a of the first thin film transistor through the first contact hole 185a and receives a data voltage from the first drain electrode 175a.

The first subpixel electrode 191a is connected with the second drain electrode 175b of the second thin film transistor. In detail, referring to FIGS. 5 to 7, the first subpixel electrode 191a and the second drain electrode 175b are connected to each other through the connection signal line 127 positioned on the same layer as the gate line 121. The connection signal line 127 is connected with the second drain electrode 175b through the second contact hole 185b, and the connection signal line 127 transverses the pixel area and is connected with the first subpixel electrode 191a through the third contact hole 185c positioned in the extension of the first subpixel electrode 191a. Accordingly, the voltage applied to the second drain electrode 175b is applied to the first subpixel electrode 191a along the connection signal line 127. That is, the second drain electrode 175b and the first subpixel electrode 191a are electrically connected to each other through the connection signal line 127.

In this case, a part of the data voltage applied to the second drain electrode 175b is divided through the third source electrode 173c, and as a result, a magnitude of the voltage applied to the first subpixel electrode 191a is smaller than that of the voltage applied to the second subpixel electrode 191b.

The first subpixel electrode 191a and the second subpixel electrode 191b to which the data voltages are applied generate an electric field together with a common electrode 270 of the upper panel 200 to determine alignment directions of the liquid crystal molecules 31 of the liquid crystal layer 3 between the two electrodes 191 and 270. Luminance of light passing through the liquid crystal layer 3 varies according to the alignment directions of the liquid crystal molecules 31 determined above.

Figure 8:
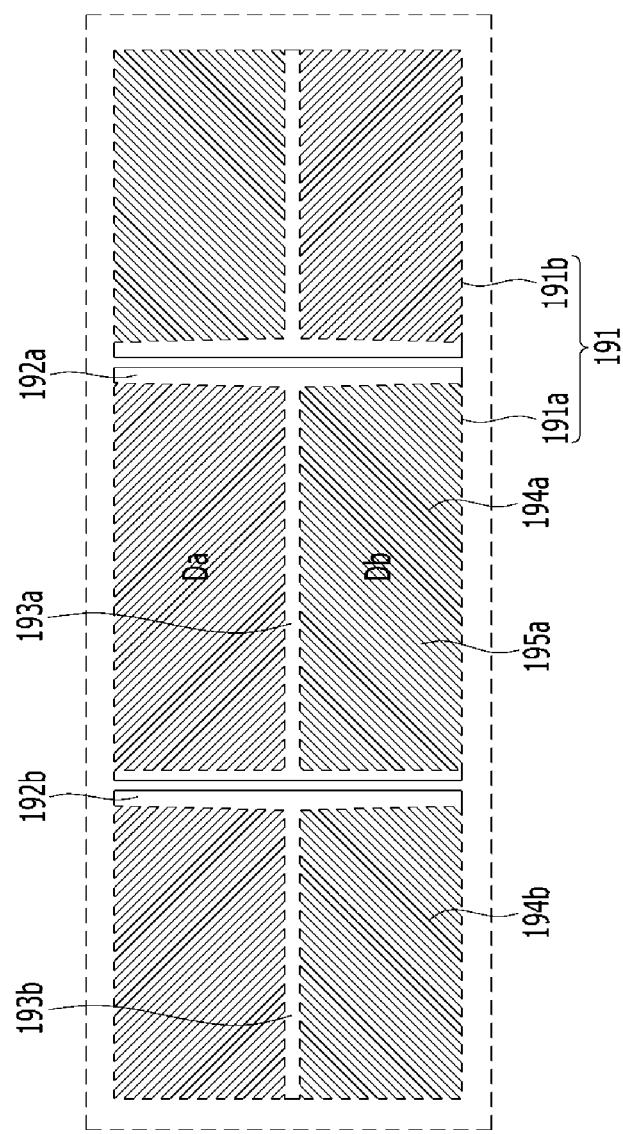
FIGS. 8 and 9 are plan views of one pixel electrode according to another exemplary embodiment.
Figure 9:
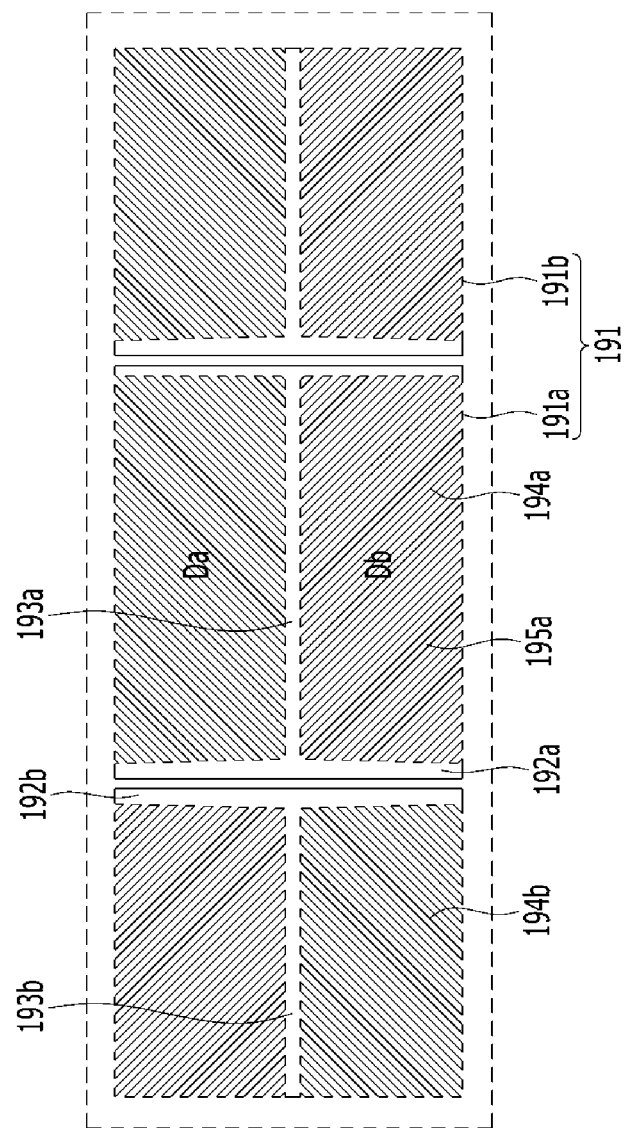
Figure 10:
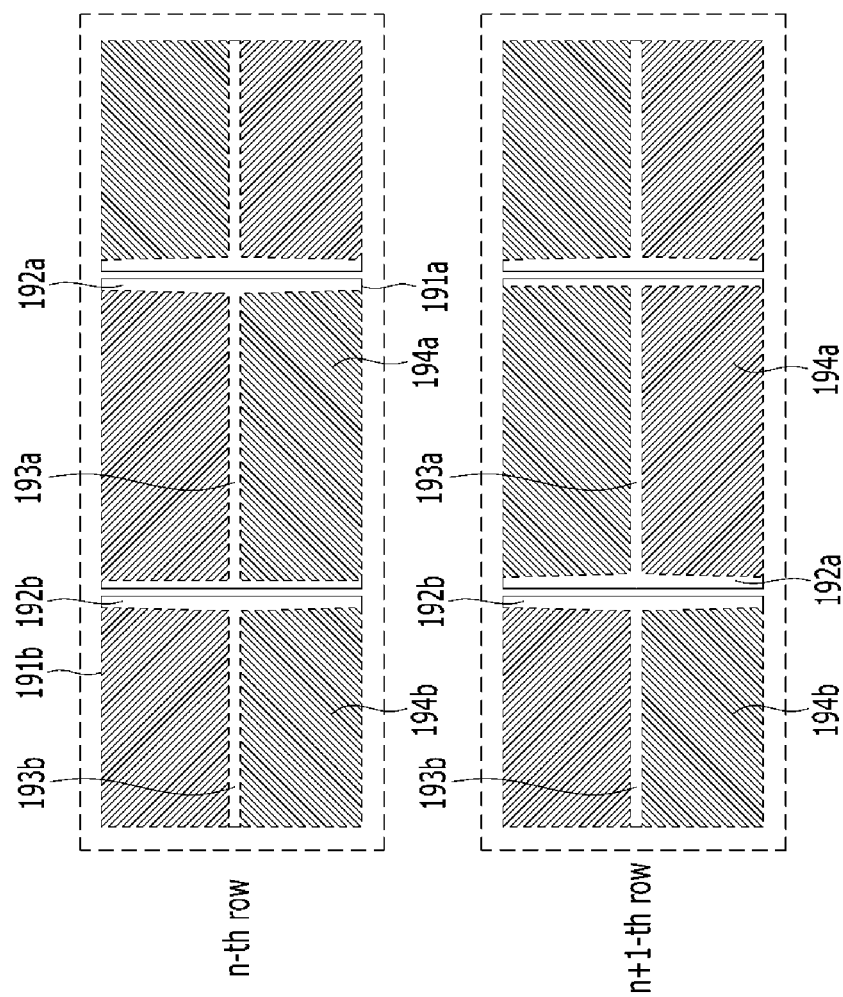
FIGS. 10 and 11 are plan views of arrangement of a plurality of pixel electrodes according to another exemplary embodiment.
Figure 11:
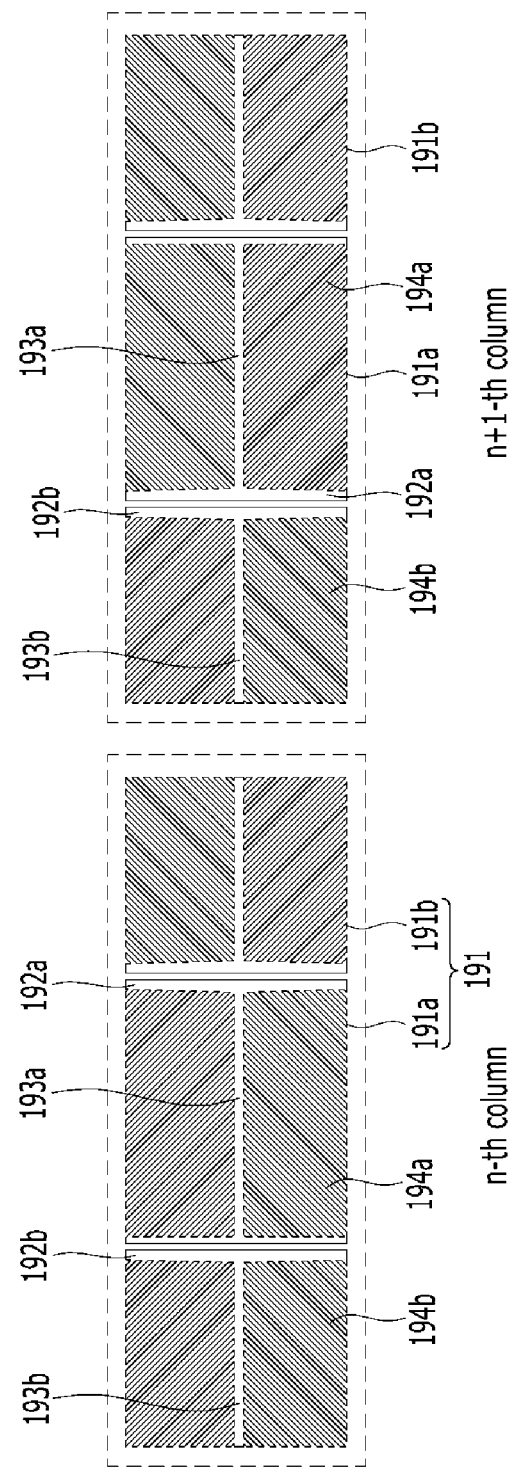

Hereinafter, a pixel area according to another exemplary embodiment will be described with reference to FIGS. 8 to 11. FIGS. 8 and 9 are plan views of one pixel electrode according to another exemplary embodiment, and FIGS. 10 and 11 are plan views of arrangement of a plurality of pixel electrodes according to another exemplary embodiment.

In another exemplary embodiment, only the display area except for the thin film transistor formation area will be described. The omitted thin film transistor formation area is the same as or similar to exemplary embodiments described above.

First, referring to FIGS. 8 and 9, the pixel electrode 191 includes one first subpixel electrode 191a and two second subpixel electrodes 191b positioned at both left and right sides of the first subpixel electrode 191a.

According to another exemplary embodiment, a high gray is applied to any one of the first subpixel electrode 191a and the second subpixel electrode 191b and a low gray may be applied to the other electrode thereof.

As illustrated in FIGS. 8 and 9, a shape of each of the first subpixel electrode 191a and the second subpixel electrode 191b is a quadrangle, and the first subpixel electrode 191a and the second subpixel electrode 191b include horizontal stems 193a and 193b, vertical stems 192a and 192b orthogonal to the horizontal stems 193a and 193b, and minute branches 194a and 194b extended from the vertical stems 192a and 192b.

As illustrated in FIG. 8, the first subpixel electrode 191a includes a first horizontal stem 193a and a first vertical stem 192a positioned to be vertical to one end of the first horizontal stem 193a, and as an example, is connected to a right end of the first horizontal stem 193a.

The first subpixel electrode 191a includes a first domain Da and a second domain Db which are divided based on the first horizontal stem 193a and the first vertical stem 192a described above, and a plurality of first minute branches 194a extended from the first horizontal stem 193a and the first vertical stem 192a is positioned at the first and second domains Da and Db. A first minute slit 195a is positioned between the first minute branches 194a in a quadrangular shape of a basic electrode.

According to the exemplary embodiment of the FIG. 8, the first minute branches 194a are extended in an upper left direction in the first domain and extended in a lower left direction in the second domain Db.

The side of the first minute branch 194a makes a horizontal component which determines a tilt direction of the liquid crystal molecules 31 by distorting an electric field. The horizontal component of the electric field is substantially horizontal to the side of the first minute branch 194a. Accordingly, the liquid crystal molecules are tilted in a parallel direction to a longitudinal direction of the minute branch 194a. Because the first subpixel electrode 191a includes two domains Da and Db in which length directions of the first minute branches 194a are different from each other, the tilt directions of the liquid crystal molecules are approximately two and two regions in which alignment directions of the liquid crystal molecules are different from each other are formed in the liquid crystal layer.

The first subpixel electrode 191a according to another exemplary embodiment includes two regions in which the alignment directions of the liquid crystal molecules are divided according to the extending direction of the first minute branch 194a.

The second subpixel electrode 191b includes a second horizontal stem 193b, a second vertical stem 192b which is orthogonal to an end of the second horizontal stem 193b, and second minute branches 194b extended from the second horizontal stem 193b and the second vertical stem 192b.

An exemplary embodiment includes two second subpixel electrodes 191b, and any one of the two second subpixel electrodes 191b includes a second minute branch 194b extended in a parallel direction with the first minute branch 194 of the adjacent first subpixel electrode 191a.

As an example, the second subpixel electrode 191*b* positioned at the left side of the first subpixel electrode 191*a* includes a second minute branch 194*b* extended in the same direction as the first minute branch 194*a* positioned in the first domain Da and a second minute branch 194*b* extended in the same direction as the first minute branch 194*a* positioned in the second domain Db.

That is, the second subpixel electrode 191*b* positioned at the left side of the first subpixel electrode 191*a* includes a second minute branch 194*b* extended in an upper left direction and a second minute branch 194*b* extended in a lower left direction.

The other one of the two second subpixel electrodes 191*b* includes a plurality of second minute branches 194*b* which is orthogonal to the first minute branches 194*a* or extended in parallel. In detail, the other one of the two second subpixel electrodes 191*b* includes a plurality of minute branches 194*b* extended in an upper right direction or a lower right direction.

Each second subpixel electrode 191*b* includes two regions in which alignment directions of the liquid crystal molecules are divided, and two second subpixel electrodes 191*b* include four regions in which alignment directions of the liquid crystal molecules are divided based on the second vertical stem 192*b* and the second horizontal stem 193*b* that transverses the second vertical stem 192*b*.

According to an exemplary embodiment, the alignment directions of the liquid crystal molecules aligned by the first subpixel electrode 191*a* and the liquid crystal molecules aligned by the adjacent second subpixel electrode 191*b* may be the same as each other. Accordingly, the display device according to an exemplary embodiment is curved, and as a result, even in the case where the upper and lower panels are misaligned, the alignment of the liquid crystal molecules is not distorted to control generation of a texture or a dark portion.

A similar exemplary embodiment to FIG. 8 will be described with reference to FIG. 9.

The first subpixel electrode 191*a* includes a first horizontal stem 193*a*, a first vertical stem 192*a* vertically connected to one end of the first horizontal stem 193*a*, and first minute branches 194*a* extended in a diagonal direction in the first horizontal stem 193*a* and the first vertical stem 192*a*. Particularly, according to an exemplary embodiment illustrated in FIG. 9, the first vertical stem 192*a* may be connected to a left end of the first horizontal stem 193*a*. According to an exemplary embodiment of FIG. 9, the first minute branches 194*a* extended in a diagonal direction from the first vertical stem 192*a* and the first horizontal stem 193*a*, are extended in an upper right direction Da and a lower right direction Db.

An exemplary embodiment includes two second subpixel electrodes 191*b*, and any one of the two second subpixel electrodes 191*b* includes a second minute branch 194*b* extended in a parallel direction with the first minute branch 194 of the adjacent first subpixel electrode 191*a*.

As an example, the second subpixel electrode 191*b* positioned at the right side of the first subpixel electrode 191*a* includes a second minute branch 194*b* extended in the same direction as the first minute branch 194*a* positioned in the first domain Da and a second minute branch 194*b* extended in the same direction as the first minute branch 194*a* positioned in the second domain Db.

That is, the second subpixel electrode 191*b* positioned at the right side of the first subpixel electrode 191*a* includes a second minute branch 194*b* extended in an upper right direction and a second minute branch 194*b* extended in a lower right direction.

The other one of the two second subpixel electrodes 191*b* includes a plurality of second minute branches 194*b* which is orthogonal to the first minute branches 194*a* or extended in parallel. In detail, the other one of the two second subpixel electrodes 191*b* includes a plurality of minute branches 194*b* extended in an upper left direction or a lower left direction.

Each second subpixel electrode 191*b* includes two regions in which alignment directions of the liquid crystal molecules are divided, and two second subpixel electrodes 191*b* include four regions in which alignment directions of the liquid crystal molecules are divided based on the second vertical stem 192*b* and the second horizontal stem 193*b* that transverses the second vertical stem 192*b*.

According to an exemplary embodiment, the alignment directions of the liquid crystal molecules aligned by the first subpixel electrode 191*a* and the liquid crystal molecules aligned by the adjacent second subpixel electrode 191*b* may be the same as each other. Accordingly, the display device according to an exemplary embodiment is curved, and as a result, even in the case where the upper and lower panels are misaligned, the alignment of the liquid crystal molecules is not distorted to control generation of a texture or a dark portion.

According to an exemplary embodiment of the present invention, two second subpixel electrodes 191*b* may be connected to each other through a connecting portion (not illustrated) to receive the same voltage.

According to the aforementioned exemplary embodiment, the first subpixel electrode 191*a* and the second subpixel electrode 191*b* include two regions according to the alignment of the liquid crystal molecules, respectively. Further, ab exemplary embodiment includes two second subpixel electrodes 191*b* having different alignments of the liquid crystal molecules, and one pixel area may include six regions divided according to the alignment direction of the liquid crystal molecules.

In the aforementioned exemplary embodiment, a separate contact hole is not illustrated, but the second subpixel electrodes 191*b* may be connected with the connection signal line in either the vertical stem or the horizontal stem.

Various exemplary embodiments in which the plurality of pixel areas is arranged will be described with reference to FIGS. 10 and 11.

First, referring to FIG. 10, one pixel area positioned in an n-th row exists, and the corresponding pixel area is an exemplary embodiment in which the first vertical stem 192*a* is connected to the right end of the first horizontal stem 193*a* as illustrated in FIG. 8. Accordingly, the first minute branches 194*a* are extended in the upper left direction and the lower left direction, and the liquid crystal molecules are aligned to be parallel to the first minute branches 194*a*.

As illustrated in FIG. 10, in one pixel area positioned in an n+1-th row, the first vertical stem 192*a* may be connected to a left end of the first horizontal stem 193*a*. Accordingly, the first minute branches 194*a* are extended in the upper right direction and the lower right direction, and the liquid crystal molecules are aligned to be parallel to the first minute branches 194*a*.

In summary, the liquid crystal molecules aligned by the first subpixel electrode positioned in the n-th row are aligned in the upper left direction and the lower left direction and the liquid crystal molecules aligned by the first subpixel electrode 191*a* positioned in the n+1-th row are aligned in the upper right direction and the lower right direction. As a result, the plurality of first subpixel electrodes 191a positioned in the adjacent pixel areas includes a total of four regions divided according to the alignment direction of the liquid crystal molecules.

Next, referring to FIG. 11, in one pixel area positioned in an n-th column, the first vertical stem 192a is connected to the right end of the first horizontal stem 193a as illustrated in FIG. 8. Accordingly, the first minute branches 194a are extended in the upper left direction and the lower left direction, and the liquid crystal molecules are aligned to be parallel to the first minute branches 194a.

As illustrated in FIG. 11, in one pixel area positioned in an n+1-th column, the first vertical stem 192a may be connected to a left end of the first horizontal stem 193a. Accordingly, the first minute branches 194a are extended in the upper right direction and the lower right direction, and the liquid crystal molecules are aligned to be parallel to the first minute branches 194a.

Accordingly, the liquid crystal molecules aligned by the first subpixel electrode positioned in the n-th column are aligned in the upper left direction and the lower left direction and the liquid crystal molecules aligned by the first subpixel electrode 191a positioned in the n+1-th column are aligned in the upper right direction and the lower right direction. As a result, the plurality of first subpixel electrodes 191a positioned in the adjacent pixel areas includes a total of four regions divided according to the alignment direction of the liquid crystal molecules.

As illustrated in FIGS. 10 and 11, a plurality of pixel areas may have various alignment directions of the liquid crystal molecules through the first vertical stems 192a of the first subpixel electrodes which are alternatively positioned in a row direction or a column direction, thereby providing uniform luminance. A combination of the aforementioned exemplary embodiment is possible.

Figure 12:
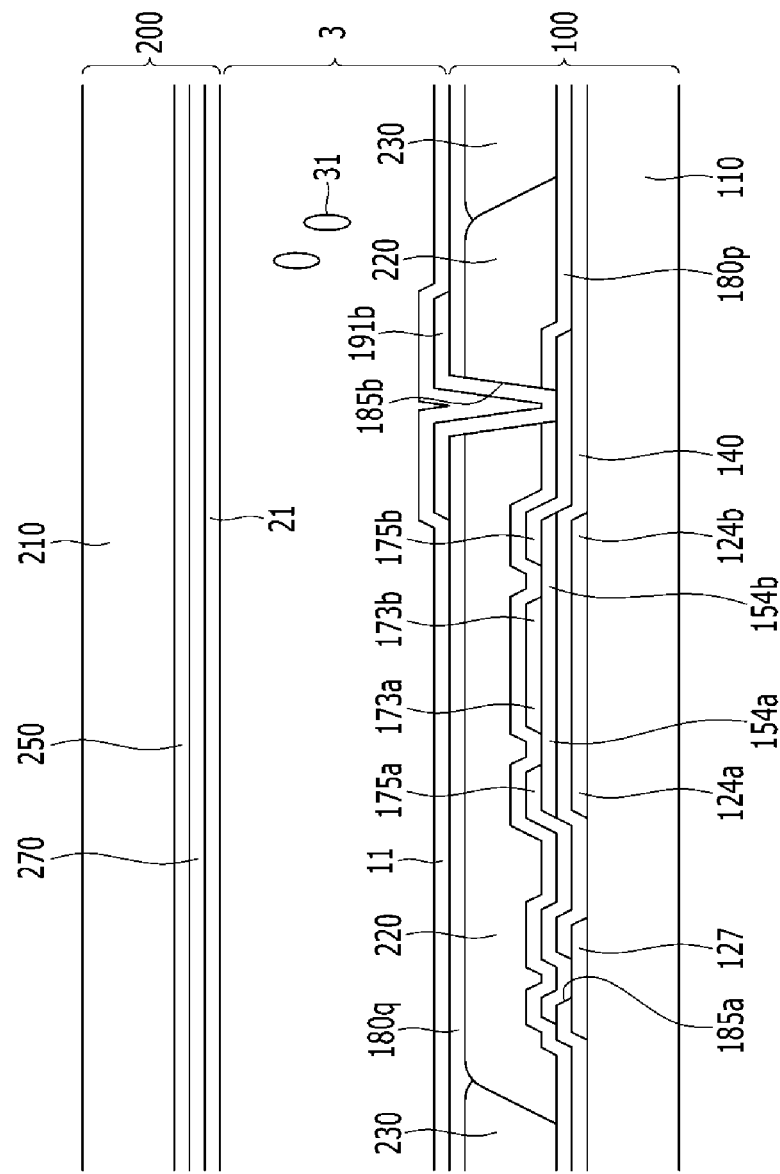
FIG. 12 is a cross-sectional view according to another exemplary embodiment.

Hereinafter, a cross-sectional view of one pixel area according to another exemplary embodiment will be described with reference to FIG. 12. FIG. 12 is a cross-sectional view according to another exemplary embodiment.

The exemplary embodiment illustrated in FIG. 12 is substantially similar to the exemplary embodiment of FIG. 3, but the position of the light blocking member 220 is different.

The light blocking member 220 according to another exemplary embodiment may be positioned on the lower panel 100, and as an example, may be positioned on the same layer as the color filter 230. Further, the light blocking member 220 according to the exemplary embodiment may include a column spacer function.

That is, both the color filter 230 and the blocking member 220 according to an exemplary embodiment may be positioned on the lower panel 100, but are not limited thereto, and of course, the color filter 230 and the blocking member 220 may be positioned even on either the upper panel 200 or the lower panel 100.

Further, according to another exemplary embodiment, the drain electrode and the connection signal line may be electrically and physically connected to each other without a separate connection bridge.

Hereinabove, exemplary embodiments in which the high-gray pixel electrode and the low-gray pixel electrode have different voltage levels by using the reference voltage line is mainly described. Hereinafter, an exemplary embodiment in which voltage levels of two subpixel electrodes are changed by various methods will be described with reference to FIGS. 13 to 17. FIGS. 13 to 17 are equivalent circuit diagrams of a pixel according to exemplary embodiments.

First, the exemplary embodiment of FIG. 13 will be described.

Figure 13:
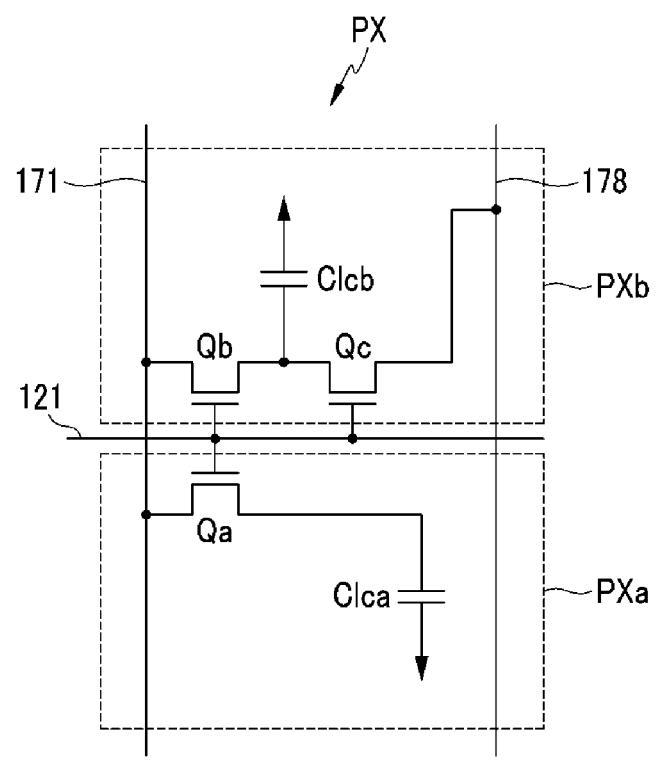
FIGS. 13, 14, 15, 16, and 17 are equivalent circuit diagrams of a pixel according to the exemplary embodiment.

The exemplary embodiment of FIG. 13 illustrates a circuit diagram of the pixel in which voltages having different levels are applied to two subpixel electrodes by using the reference voltage line 178 as described above.

In FIG. 13, the high-gray subpixel is illustrated as PXa, and the low-gray subpixel is illustrated as PXb.

Referring to FIG. 13, the liquid crystal display device according to an exemplary embodiment may include signal lines including a gate line 121, a data line 171, a reference voltage line 178 transferring a reference voltage, and the like, and a pixel PX connected thereto.

Each pixel PX includes first and second subpixels PXa and PXb. The first subpixel PXa includes a first switching element Qa and a first liquid crystal capacitor Clca. The second subpixel PXb includes second and third switching elements Qb and Qc, and a second liquid crystal capacitor Clcb. The first switching element Qa and the second switching elements Qb are connected to the gate line 121 and the data line 171, respectively. The third switching element Qc is connected to an output terminal of the second switching element Qb and the reference voltage line 178. An output terminal of the first switching element Qa is connected to the first liquid crystal capacitor Clca, and an output terminal of the second switching element Qb is connected to the second liquid crystal capacitor Clcb and the input terminal of the third switching element Qc. A control terminal of the third switching element Qc is connected to the gate line 121, an input terminal thereof is connected to the second liquid crystal capacitor Clcb, and an output terminal thereof is connected to the reference voltage line 178.

In an operation of the pixel PX illustrated in FIG. 13, first, when a gate-on voltage Von is applied to the gate line 121, the first switching element Qa, the second switching element Qb, and the third switching element Qc which are connected to the gate line 121 are turned on. Accordingly, the data voltage applied to the data line 171 is applied to the first liquid crystal capacitor Clca and the second liquid crystal capacitor Clcb through the turned-on first switching element Qa and second switching element Qb, respectively, and as a result, the first liquid crystal capacitor Clca and the second liquid crystal capacitor Clcb are charged by a difference between the data voltage and the common voltage Vcom. In this case, the same data voltage is transferred to the first liquid crystal capacitor Clca and the second liquid crystal capacitor Clcb through the first and second switching elements Qa and Qb, but the charging voltage of the second liquid crystal capacitor Clcb is divided through the third switching element Qc. Accordingly, because the charging voltage of the second liquid crystal capacitor Clcb is lower than the charging voltage of the first liquid crystal capacitor Clca, luminance of the two subpixels PXa and PXb may be different from each other. Accordingly, when the voltage charged in the first liquid crystal capacitor Clca and the voltage charged in the second liquid crystal capacitor Clcb are appropriately controlled, an image viewed from the side may be maximally approximated to an image viewed from the front, thereby improving side visibility.

However, the structure of the pixel PX of the liquid crystal display device is not limited to the exemplary embodiment illustrated in FIG. 13 and may be various.

Figure 14:
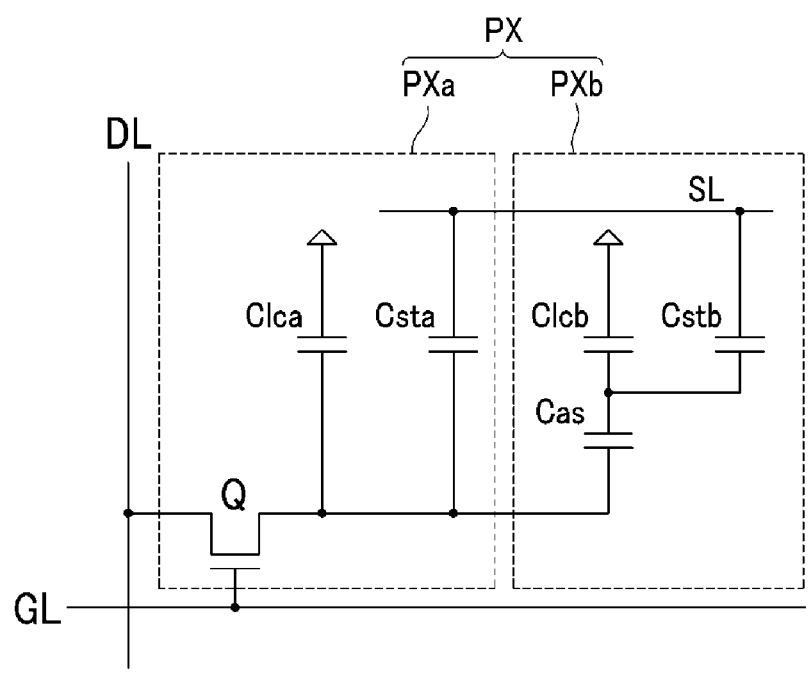

Hereinafter, an exemplary embodiment of FIG. 14 will be described.

The liquid crystal display device according to an exemplary embodiment includes signal lines including a plurality of gate lines GL, a plurality of data lines DL, and a plurality of storage electrode lines SL, and a plurality of pixels PX connected thereto. Each pixel PX includes a pair of first and second subpixels PXa and PXb, and a first subpixel electrode is formed in the first subpixel PXa and a second subpixel electrode is formed in the second subpixel PXb.

The liquid crystal display device according to tan exemplary embodiment further includes a switching element Q connected to the gate line GL and the data line DL, a first liquid crystal capacitor Clca and a first storage capacitor Csta which are formed in the first subpixel PXa connected to the switching element Q, a second liquid crystal capacitor Clcb and a second storage capacitor Cstb which are formed in the second subpixel PXb connected to the switching element Q, and an auxiliary capacitor Cas formed between the switching element Q and the second liquid crystal capacitor Clcb.

The switching element Q is a three-terminal element such as a thin film transistor provided in the lower panel 100, and a control terminal thereof is connected to the gate line GL, an input terminal is connected to the data line DL, and an output terminal is connected to the first liquid crystal capacitor Clca, the first storage capacitor Csta, and the auxiliary capacitor Cas.

One terminal of the auxiliary capacitor Cas is connected to an output terminal of the switching element Q, and the other terminal thereof is connected to the second liquid crystal capacitor Clcb and the second storage capacitor Cstb.

A charged voltage of the second liquid crystal capacitor Clcb is lower than a charged voltage of the first liquid crystal capacitor Clca by the auxiliary capacitor Cas, thereby improving side visibility of the liquid crystal display device.

Figure 15:
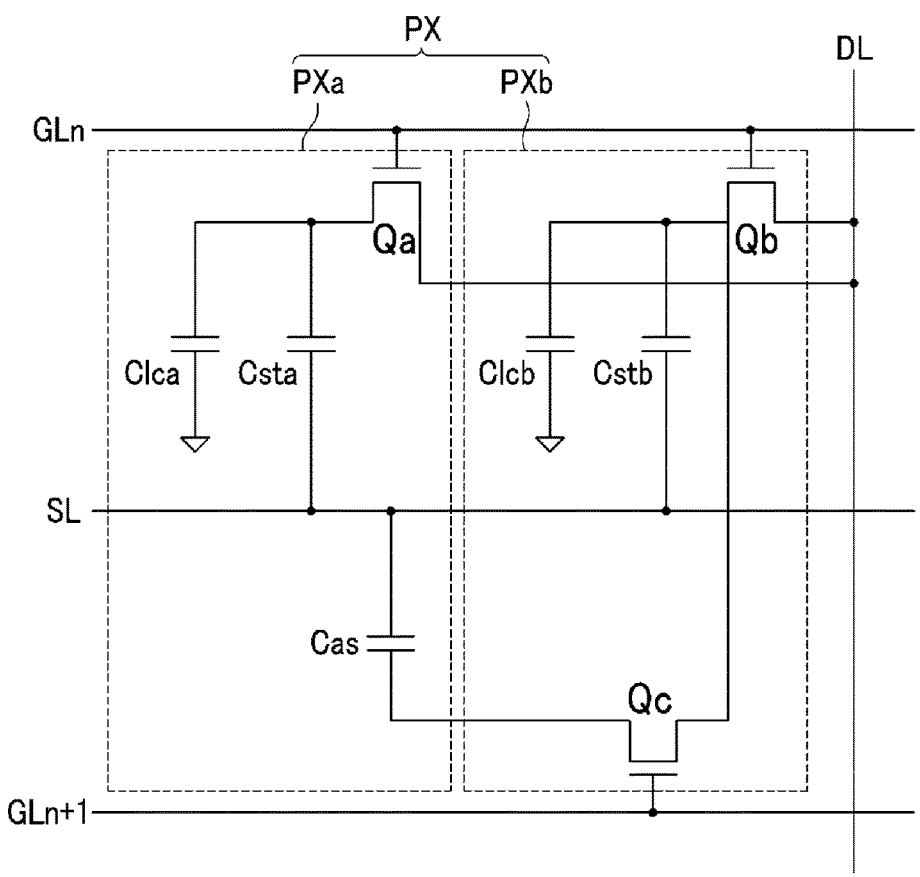

Hereinafter, an exemplary embodiment of FIG. 15 will be described.

The liquid crystal display device according to an exemplary embodiment includes signal lines including a plurality of gate lines GLn and GLn+1, a plurality of data lines DL, and a plurality of storage electrode lines SL, and a plurality of pixels PX connected thereto. Each pixel PX includes a pair of first and second subpixels PXa and PXb, and a first subpixel electrode is formed in the first subpixel PXa and a second subpixel electrode is formed in the second subpixel PXb.

The liquid crystal display device according to an exemplary embodiment further includes a first switching element Qa and a second switching element Qb connected to the gate line GLn and the data line DL, a first liquid crystal capacitor Clca and a first storage capacitor Csta which are connected to the first switching element Qa to be formed in the first subpixel PXa, a second liquid crystal capacitor Clcb and a second storage capacitor Cstb which are connected to the second switching element Qb to be formed in the second subpixel PXb, a third switching element Qc which is connected with the second switching element Qb and switched by the next gate line GLn+1, and an auxiliary capacitor Cas connected with the third switching element Qc.

The first switching element Qa and the second switching element Qb are three-terminal elements such as a thin film transistor provided on the lower panel 100, and control terminals thereof are connected to the gate line GLn, input terminals are connected to the data line DL, and output terminals are connected to the first liquid crystal capacitor Clca and the first storage capacitor Csta, and the second liquid crystal capacitor Clcb and the second storage capacitor Cstb, respectively.

The third switching element Qc is also a three-terminal element such as a thin film transistor provided on the lower panel, and a control terminal thereof is connected to the gate line GLn+1 of the next stage, an input terminal thereof is connected to the second liquid crystal capacitor Clcb, and an output terminal thereof is connected to the auxiliary capacitor Cas.

One terminal of the auxiliary capacitor Cas is connected to an output terminal of the third switching element Qc, and the other terminal thereof is connected to the storage electrode line SL.

In the operation of the liquid crystal display device according to the exemplary embodiment, when a gate-on voltage is applied to the gate line GLn, the first and second switching elements Qa and Qb which are connected to the gate line are turned on, and the data voltage of the data line DL is applied to the first and second subpixel electrodes.

Next, when a gate-off voltage is applied to the gate line GLn and the gate-on voltage is applied to the next gate line GLn+1, the first and second switching elements Qa and Qb are turned off and the third switching element Qc is turned on. As a result, a charge of the second subpixel electrode connected with an output terminal of the second switching element Qb flows into the auxiliary capacitor Cas and thus the voltage of the second liquid crystal capacitor Clcb drops.

As such, the charged voltages of the first and second liquid crystal capacitors Clca and Clcb are different from each other, thereby improving side visibility of the liquid crystal display device.

Figure 16:
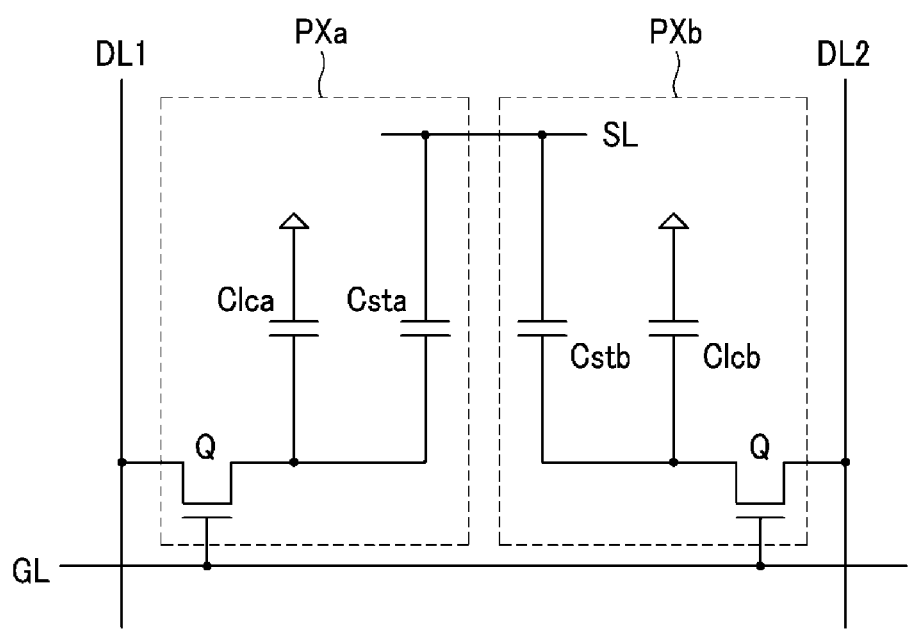

Hereinafter, an exemplary embodiment of FIG. 16 will be described.

The liquid crystal display device according to an exemplary embodiment includes signal lines including a plurality of gate lines GL, a plurality of data lines DL1 and DL2, and a plurality of storage electrode lines SL, and a plurality of pixels PX connected thereto. Each pixel PX includes a pair of first and second liquid crystal capacitors Clca and Clcb and first and second storage capacitors Csta and Cstb.

Each subpixel includes one liquid crystal capacitor and one storage capacitor and additionally includes one thin film transistor Q. The thin film transistors Q of two subpixels that belong to one pixel are connected to the same gate line GL, but are connected to different data lines DL1 and DL2. The different data lines DL1 and DL2 simultaneously apply data voltages with different levels so that the first and second liquid crystal capacitors Clca and Clcb of two subpixels have different charged voltages. As a result, side visibility of the liquid crystal display device may be improved.

Figure 17:
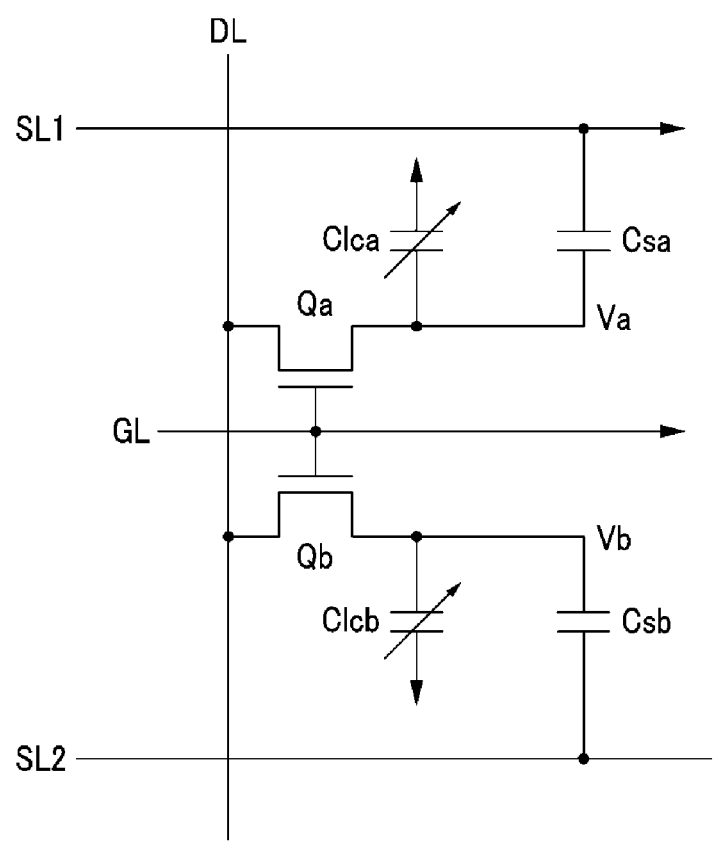

Hereinafter, an exemplary embodiment of FIG. 17 will be described.

The liquid crystal display device according to an exemplary embodiment includes a gate line GL, a data line DL, a first power supply line SL1, a second power supply line SL2, and a first switching element Qa and a second switching element Qb which are connected to the gate line GL and the data line DL.

The liquid crystal display device according to an exemplary embodiment further includes an auxiliary step-up capacitor Csa and a first liquid crystal capacitor Clca which are connected to the first switching element Qa, and an auxiliary step-down capacitor Csb and a second liquid crystal capacitor Clcb which are connected to the second switching element Qb.

The first switching element Qa and the second switching element Qb are constituted by three-terminal elements such as a thin film transistor. The first switching element Qa and the second switching element Qb are connected to the same gate line GL and the same data line DL and turned on at the same timing to output the same data signal.

Voltages, which swing at a regular cycle, are applied to the first power supply line SL1 and the second power supply line SL2. A first low voltage is applied to the first power supply line SL1 for a predetermined period (for example, 1H), and a first high voltage is applied to the first power supply line SL1 for the next predetermined period. A second high voltage is applied to the second power supply line SL2 for a predetermined period, and a second low voltage is applied to second power supply line SL2 for the next predetermined period. In this case, a first period and a second period are repeated many times for one frame and thus the swing voltages are applied to the first power supply line SL1 and the second power supply line SL2. In this case, the first low voltage and the second low voltage are the same as each other, and the first high voltage and the second high voltage may be the same as each other.

The auxiliary step-up capacitor Csa is connected to the first switching element Qa and the first power supply line SL1, and the step-down capacitor Csb is connected to the second switching element Qb and the second power supply line SL2.

A voltage Va of a terminal (hereinafter, referred to as a 'first terminal') of a portion where the auxiliary step-up capacitor Csa is connected with the first switching element Qa is decreased when the first low voltage is applied to the first power supply line SL1 and increased when the first high voltage is applied to the first power supply line SL1. Thereafter, as the voltage of the first power supply line SL1 swings, the voltage Va of a first terminal swings.

Further, a voltage Vb of a terminal (hereinafter, referred to as a 'second terminal') of a portion where the auxiliary step-down capacitor Csb is connected with the second switching element Qb is decreased when the second high voltage is applied to the second power supply line SL2 and increased when the second low voltage is applied to the second power supply line SL2. Thereafter, as the voltage of the second power supply line SL2 swings, the voltage Vb of a second terminal swings.

As such, even though the same data voltage is applied to the two subpixels, the voltages Va and Vb of the pixel electrode of the two subpixels are changed according to magnitudes of the swing voltages in the first and second power supply lines SL1 and SL2, and as a result, transmittance of two subpixels varies and side visibility may be improved.

In the exemplary embodiment of FIGS. 14 to 17, the reference voltage line is not used, but some lines are formed to vertically transverse the center of the display area of the pixel by using any line parallel to the data line, thereby improving display quality.

In the liquid crystal display device as described above, a unit pixel electrode belonging to the pixel electrode has minute branches 194a and 194b, and the number of unit pixel electrodes is increased and the number of minute branches 194a and 194b is also increased. As a result, the liquid crystal display device may have liquid crystal control force enough to control the liquid crystal molecules and thus prepolymer polymerized by light may not be separately included in the liquid crystal layer.

However, according to an exemplary embodiment, the liquid crystal control force may partially deteriorate, and thus the prepolymer may be included in the liquid crystal layer.

Figure 18:
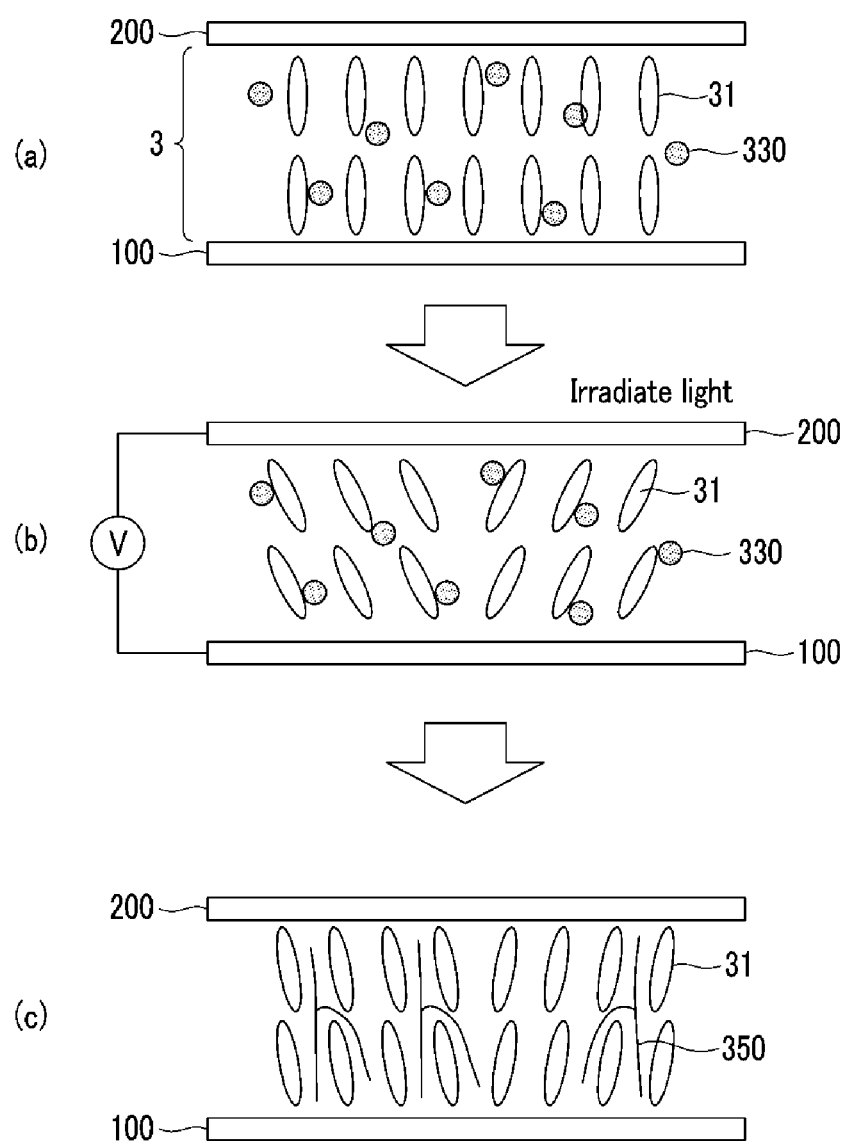
FIG. 18 is a diagram illustrating a process performed so that liquid crystal molecules have pretilts by using prepolymer polymerized by light such as ultraviolet light.

In the case of including the prepolymer, a method of forming pretilts is illustrated in FIG. 18. FIG. 18 is a diagram illustrating a process performed so that liquid crystal molecules have pretilts by using prepolymer polymerized by light such as ultraviolet light.

Referring to FIG. 18, first, a prepolymer 330 such as monomers cured by polymerization due to light such as ultraviolet light is injected between two panels 100 and 200 together with a liquid crystal material. The prepolymer 330 may include reactive mesogen polymerized by the light such as ultraviolet light.

Next, data voltages are applied to the first and second subpixel electrodes and a common voltage is applied to the common electrode 270 of the upper panel 200 to generate an electric field in the liquid crystal layer 3 between the two panels 100 and 200. Then, liquid crystal molecules 31 of the liquid crystal layer 3 are included in a predetermined direction in response to the electric field.

In a state where the liquid crystal molecules 31 of the liquid crystal layer 3 are tilted in the predetermined direction, when the light such as ultraviolet light is irradiated, the prepolymer 330 is polymerized to form a pretilt providing polymer 350 as illustrated in FIG. 18. The pretilt providing polymer 350 is formed by contacting the panels 100 and 200. An alignment direction of the liquid crystal molecules 31 is determined by the pretilt providing polymer 350 so as to have pretilts in the direction described above. Accordingly, even in a state where the voltages are not applied to the field generating electrodes, the liquid crystal molecules 31 are aligned so as to have pretilts in four different directions.

As a result, the liquid crystal molecules 31 have pretilts in total four directions in each region of an upper subpixel or a lower subpixel of one pixel.

The pretilts using the polymer as illustrated in FIG. 18 are additionally used when the texture is not reduced by only the liquid crystal control force provided by the minute branches of the color filter.

In FIG. 18, an exemplary embodiment in which a photoreactive material is included in the liquid crystal layer is mainly described, but even in the case where the photoreactive material is included in the alignment layer, the liquid crystal display device is formed correspondingly thereto.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

<Description of symbols>

| | |
|---|---|
| 100: Lower panel | 121: Gate line |
| 124: Gate electrode | 154: Semiconductor |
| 171: Data line | 173: Source electrode |
| 175: Drain electrode | 191: Pixel electrode |
| 200: Upper panel | 230: Color filter |
| 270: Common electrode | 3: Liquid crystal layer |
| 300: Display panel | 31: Liquid crystal molecule |
| 400: Gate driver | 500: Data driver |

What is claimed is:

1. A liquid crystal display device, comprising:
a first insulation substrate;
a gate line and a data line positioned on the first insulation substrate and insulatively crossing each other;
a thin film transistor connected with the gate line and data line;
a pixel electrode connected with the thin film transistor;

a second insulation substrate spaced apart from and facing the first insulation substrate; and a common electrode positioned on the second insulation substrate, and a dummy electrode pattern positioned on the same layer as the gate line, wherein the pixel electrode includes:

a first subpixel electrode including first minute branches extended in a plurality of directions and a second subpixel electrode separated from the first subpixel electrode and including second minute branches, wherein one pixel includes the thin film transistor and the pixel electrode, and extending directions of the first minute branches and the second minute branches which are adjacent to each other in an extending direction of the gate line within one pixel are parallel to each other, and wherein the dummy electrode pattern is disposed between the first subpixel electrode and the second subpixel electrode.

2. The liquid crystal display device of claim 1, wherein:
the liquid crystal display device is curved.

3. The liquid crystal display device of claim 1, wherein:
one first subpixel electrode is included and two second subpixel electrodes are included, and
the two second subpixel electrodes are positioned at left and right sides of the first subpixel electrode, respectively.

4. The liquid crystal display device of claim 3, wherein:
the two second subpixel electrodes are connected to each other.

5. The liquid crystal display device of claim 3, wherein:
the first subpixel electrode further includes a cross stem and an extension positioned at the center of the cross stem, and the first minute branch is extended from the cross stem.

6. The liquid crystal display device of claim 5, wherein:
a planar shape of the extension is any one of polygons or similar polygons.

7. The liquid crystal display device of claim 5, wherein:
the first subpixel electrode includes four regions divided according to an alignment direction of the liquid crystal molecules,
each of the second subpixel electrodes includes two regions divided according to an alignment direction of the liquid crystal molecules, and
the two second subpixel electrodes have different alignment directions of the liquid crystal molecules.

8. The liquid crystal display device of claim 3, wherein:
the one pixel area includes a high-gray pixel area and a low-gray pixel area, and
the thin film transistor includes
a first thin film transistor connected with the high-gray pixel area,
a second thin film transistor connected with the low-gray pixel area, and
a third thin film transistor connected with the second thin film transistor and a reference voltage line.

9. The liquid crystal display device of claim 8, further comprising:
a semiconductor layer positioned on the gate line,
wherein the gate line is positioned on the first insulation substrate, and
the data line is positioned on the semiconductor layer and includes a source electrode.

10. The liquid crystal display device of claim 9, further comprising:
an auxiliary signal line positioned on the same layer as the pixel electrode and overlapping with the data line.

11. The liquid crystal display device of claim 8, wherein:
the first subpixel electrode is connected with a first thin film transistor, and
the second subpixel electrode is connected with a second thin film transistor.

12. The liquid crystal display device of claim 11, further comprising:
a connection signal line positioned on the same layer as the gate line,
wherein the connection signal line is electrically connected with the first thin film transistor and the first subpixel electrode.

13. The liquid crystal display device of claim 12, wherein:
the connection signal line transverses the pixel electrode in the extending direction of the gate line.

14. The liquid crystal display device of claim 8, wherein:
the reference voltage line includes
a vertical portion positioned to overlap a vertical boundary between the first subpixel electrode and the second subpixel electrode and a horizontal portion connecting the vertical portions.

15. The liquid crystal display device of claim 8, wherein:
the first thin film transistor is connected to the second subpixel electrode,
the second thin film transistor is connected to the first subpixel electrode, and
an area of the first subpixel electrode is larger than that of the plurality of second subpixel electrodes.

16. The liquid crystal display device of claim 15, further comprising:
a connection signal line positioned on the same layer as the gate line,
wherein the connection signal line is electrically connected with the second thin film transistor and the first subpixel electrode.

17. The liquid crystal display device of claim 1, wherein:
the first subpixel electrode includes two regions divided according to an alignment direction of the liquid crystal molecules.

18. The liquid crystal display device of claim 17, wherein:
a plurality of the first subpixel electrodes included in the adjacent pixel area includes four regions divided according to an alignment direction of the liquid crystal molecules.

19. The liquid crystal display device of claim 1, further comprising:
a gate insulating layer positioned on the gate line;
a passivation layer positioned on the data line; and
a color filter positioned on the passivation layer.

20. The liquid crystal display device of claim 19, further comprising:
a light blocking member positioned on the passivation layer.

21. The liquid crystal display device of claim 19, wherein:
the color filter is the same color in the extending direction of the gate line.

22. The liquid crystal display device of claim 1, wherein a length of the pixel electrode in an extension direction of the gate line is longer than a length in an extension direction of the data line.

* * * * *